US008035721B2

(12) United States Patent
Honjo et al.

(10) Patent No.: US 8,035,721 B2
(45) Date of Patent: Oct. 11, 2011

(54) IMAGING APPARATUS

(75) Inventors: Kenichi Honjo, Shijonawate (JP); Mitsuyoshi Okamoto, Hirakata (JP); Minori Sato, Yokohama (JP); Kenji Maeda, Takatsuki (JP); Seiichi Suzuki, Katano (JP)

(73) Assignee: Panasonic Corporation, Osaka (JP)

( * ) Notice: Subject to any disclaimer, the term of this patent is extended or adjusted under 35 U.S.C. 154(b) by 1410 days.

(21) Appl. No.: 11/194,778

(22) Filed: Aug. 2, 2005

(65) Prior Publication Data

US 2006/0028577 A1    Feb. 9, 2006

(30) Foreign Application Priority Data

Aug. 5, 2004    (JP) .................. 2004-229530

(51) Int. Cl.
*G02B 13/16* (2006.01)
*H04N 5/225* (2006.01)
(52) U.S. Cl. ......... 348/335; 348/340; 348/345; 348/348
(58) Field of Classification Search .................. 348/335, 348/340, 345, 348
See application file for complete search history.

(56) References Cited

U.S. PATENT DOCUMENTS

| | | | |
|---|---|---|---|
| 5,031,049 A | 7/1991 | Toyama et al. | |
| 5,204,749 A | 4/1993 | Toyama et al. | |
| 5,418,595 A | 5/1995 | Iwasaki et al. | |
| 5,488,429 A | 1/1996 | Kojima et al. | |
| 5,506,946 A * | 4/1996 | Bar et al. | 345/600 |
| 5,561,474 A | 10/1996 | Kojima et al. | |
| 5,638,136 A | 6/1997 | Kojima et al. | |
| 6,362,852 B2 * | 3/2002 | Ito | 348/345 |
| 2002/0167598 A1 | 11/2002 | Oeda et al. | |
| 2004/0227964 A1 * | 11/2004 | Fujino | 358/1.9 |
| 2005/0212950 A1 * | 9/2005 | Kanai | 348/345 |

FOREIGN PATENT DOCUMENTS

| | | |
|---|---|---|
| JP | 60-250318 | 12/1985 |
| JP | 62-272675 | 11/1987 |
| JP | 04-207767 | 7/1992 |
| JP | 6-121332 | 4/1994 |
| JP | 6-230453 | 8/1994 |
| JP | 09-127408 | 5/1997 |
| JP | 11-142725 | 5/1999 |
| JP | 11-146405 | 5/1999 |
| JP | 11-327030 | 11/1999 |
| JP | 2002-182106 | 6/2002 |
| JP | 2003-032699 | 1/2003 |
| JP | 2004-037733 A | 2/2004 |
| JP | 2004-040462 | 2/2004 |
| WO | WO97/00575 | 1/1997 |

* cited by examiner

*Primary Examiner* — Yogesh Aggarwal
(74) *Attorney, Agent, or Firm* — McDermott Will & Emery LLP

(57) ABSTRACT

An imaging apparatus has an image sensor that captures the optical image of an object formed by an imaging optical system and converts the optical image into the electrical still image signal, a signal processor for dividing a representation of the image signal into a plurality of areas, and for determining a color characteristic for each area of the plurality of areas, the color characteristic consisting of a hue and/or chroma saturation, a selector for selecting at least one area of the plurality of area for which its respective color characteristic substantially corresponds to a preset color characteristic, and a focus controller for determining focus parameters of the imaging apparatus for the selected area and generating a focus control signal for adjusting the image optical system based on the focus parameters.

12 Claims, 32 Drawing Sheets

FIG. 6

```
V = max (R, G, B)                    EXPRESSION 1
d = V - min (R, G, B)                EXPRESSION 2
S = d * 255 / V                      EXPRESSION 3
if (S=0) {H=0}                       EXPRESSION 4
else {
  if (V=R) H = (G-B) * 60 / d        EXPRESSION 5
  if (V=G) H = (B-R) * 60 / d + 120  EXPRESSION 6
  if (V=B) H = (R-G) * 60 / d + 240  EXPRESSION 7
}
if (H<0) {H = H + 360}               EXPRESSION 8
```

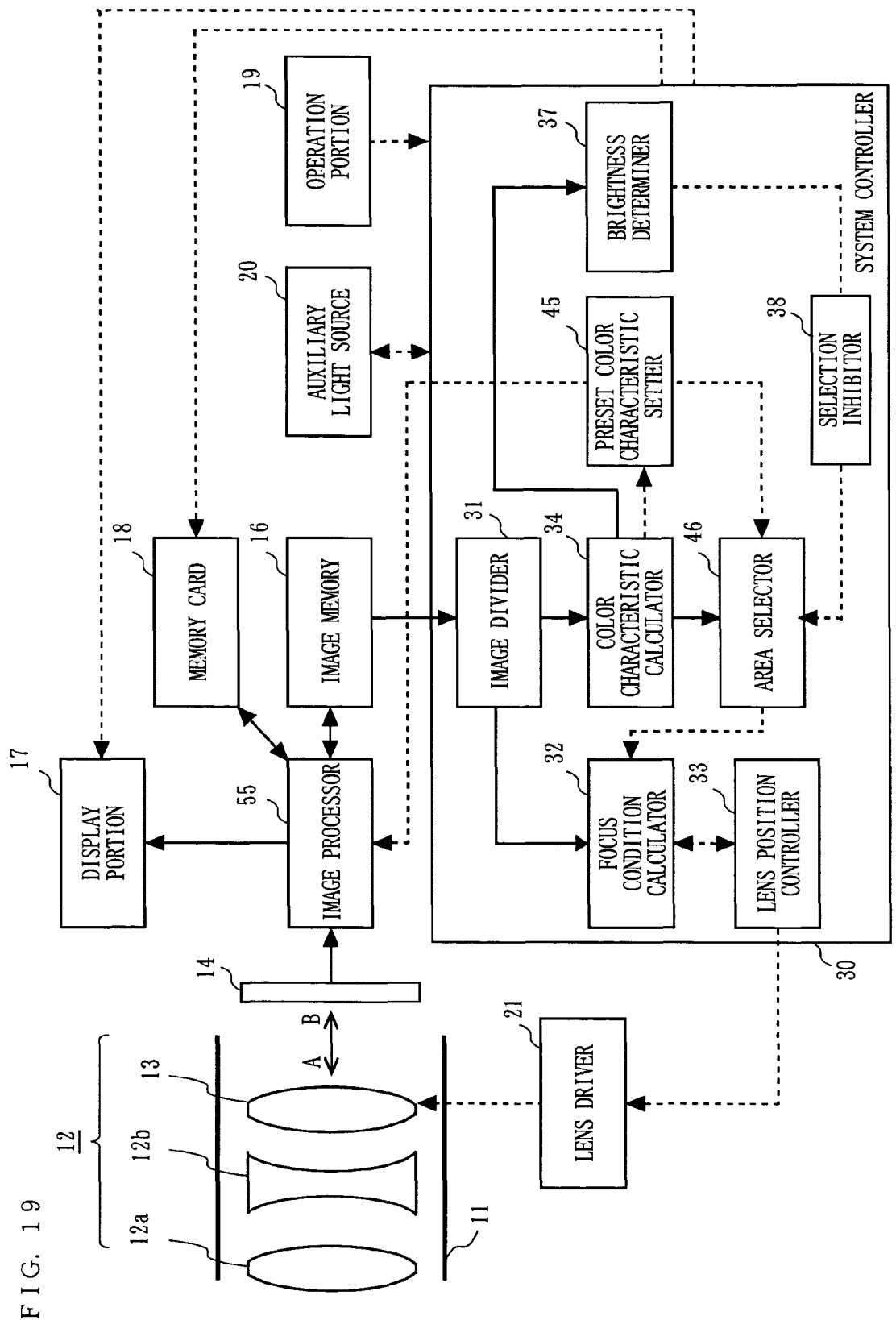

F I G. 2 0
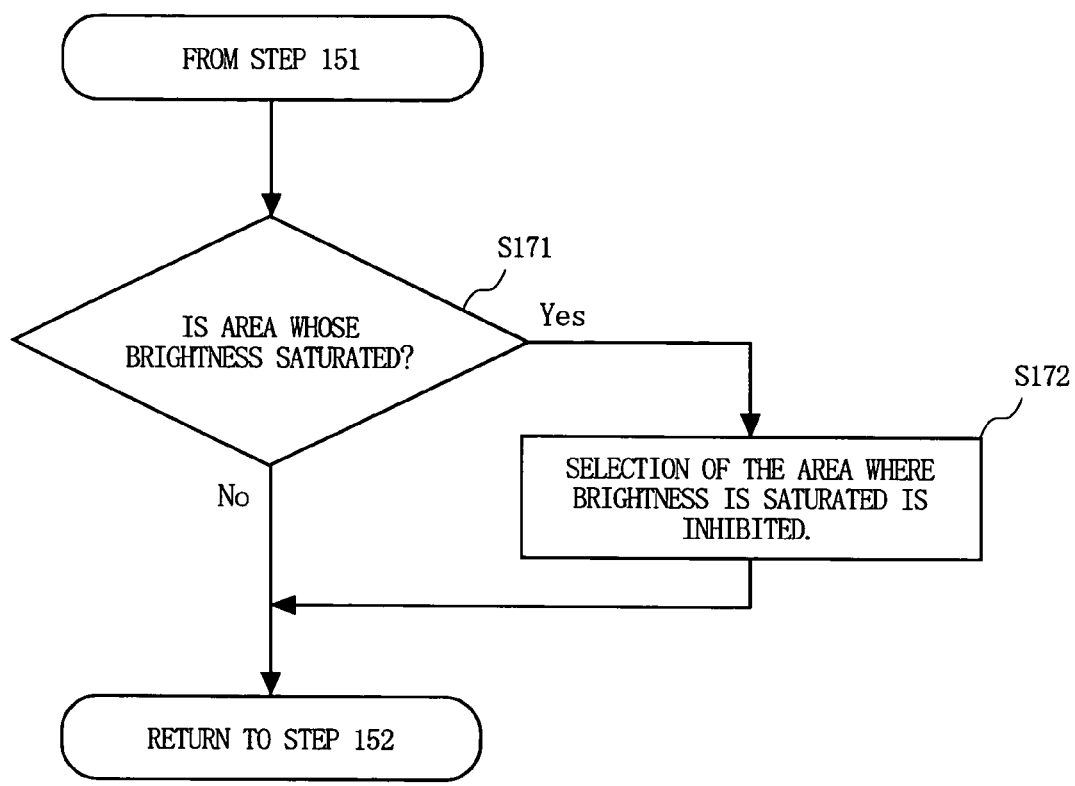

FIG. 29

| REFERENCE IMAGE | PRESET COLOR CHARACTERISTIC |
|---|---|
| REFERENCE IMAGE 1 | (Ha, Sa) |
| REFERENCE IMAGE 2 | (Hb, Sb) |
| REFERENCE IMAGE 3 | (Hc, Sc) |
| ... | ... |

IMAGING APPARATUS

BACKGROUND

1. Technical Field

The present invention relates to an imaging apparatus such as a digital still camera and a digital video camera, and more specifically, to an imaging apparatus such as a digital still camera and a digital video camera having an automatic focusing function.

2. Description of the Related Art

Presently, imaging apparatuses such as digital still cameras and digital video cameras having an image sensor such as a CCD or a CMOS are explosively widespread. The mainstream of these imaging apparatuses is a type that detects the focus condition based on the image signal of the object and performs automatic focusing control by moving the focusing lens unit included in the taking optical system in the direction of the optical axis based on the result of the detection.

As the imaging apparatuses have become multifunctional, higher functionality has been required of automatic focusing control. For example, Japanese Laid-Open Patent Publication No. 2004-37733 proposes an automatic focusing device for imaging apparatuses in which the image signal of the object is divided into a plurality of AF areas and the number of pixels of the skin color in each area is counted to thereby identify the AF area for which focus adjustment is performed.

The automatic focusing device described in Japanese Laid-Open Patent Publication No. 2004-37733 assumes that the main object is a person. That is, in the automatic focusing device described in Japanese Laid-Open Patent Publication No. 2004-37733, by performing focusing control based on the pixels of the skin color, the focus area follows the person, so that the person can be always brought in focus with accuracy.

In the automatic focusing device described in Japanese Laid-Open Patent Publication No. 2004-37733, since only a person is assumed to be the main object, the object following for focusing cannot be performed when the object is other than a person. Since the main object of digital still cameras, digital video cameras and the like is not always a person, the automatic focusing device described in Japanese Laid-Open Patent Publication No. 2004-37733 does not sufficiently meet the user's requirements.

An object of the present invention is to provide a high-functionality imaging apparatus capable of performing focus adjustment on an object which can be arbitrarily set.

SUMMARY

An imaging apparatus that outputs an electric image signal of an object, comprising: an imaging optical system that includes a focusing lens unit for performing focus adjustment, and forms an optical image of the object; an image sensor that captures the optical image of the object and converts the optical image into an electric image signal; an image divider that divides the image signal into a plurality of areas; a color characteristic calculator that calculates color characteristic from the image signal for each of the areas; a preset color characteristic setter that previously sets preset color characteristic; an area selector that selects at least one of the areas based on a result of a comparison between the preset color characteristic and each color characteristic calculated by the color characteristic calculator; a focus information calculator that calculates focus information of the imaging optical system for the selected area; and a lens driver that drives the focusing lens unit in a direction of an optical axis based on the focus information.

Preferably, an information storage that stores a plurality of pieces of preset color characteristic is further provided. More preferably, a display portion that displays the plurality of pieces of preset color characteristic stored in the information storage is further provided.

Preferably, an information storage that stores a plurality of pieces of preset color characteristic and an image signal for displaying an image associated with the preset color characteristic is further provided. More preferably, a display portion that displays at least one of an image based on the image signal stored in the information storage and the plurality of pieces of preset color characteristic is further provided.

According to the imaging apparatus, a high-functionality imaging apparatus can be provided that is capable of performing focus adjustment on an object which can be arbitrarily set.

These and other objects, features, aspects and effects will become more clear from the following detailed description with reference to the attached drawings.

BRIEF DESCRIPTION OF THE DRAWINGS

FIG. 6 shows arithmetic expressions of hue and chroma information according to the first embodiment;

FIG. 19 is a block diagram of an imaging apparatus according to a third embodiment;

FIG. 20 is an operation flowchart of the focus following imaging processing according to the third embodiment;

FIG. 29 is a view showing an example of a table stored in a preset color characteristic setter 48;

DESCRIPTION OF THE PREFERRED EMBODIMENTS

First Embodiment

Figure 1:
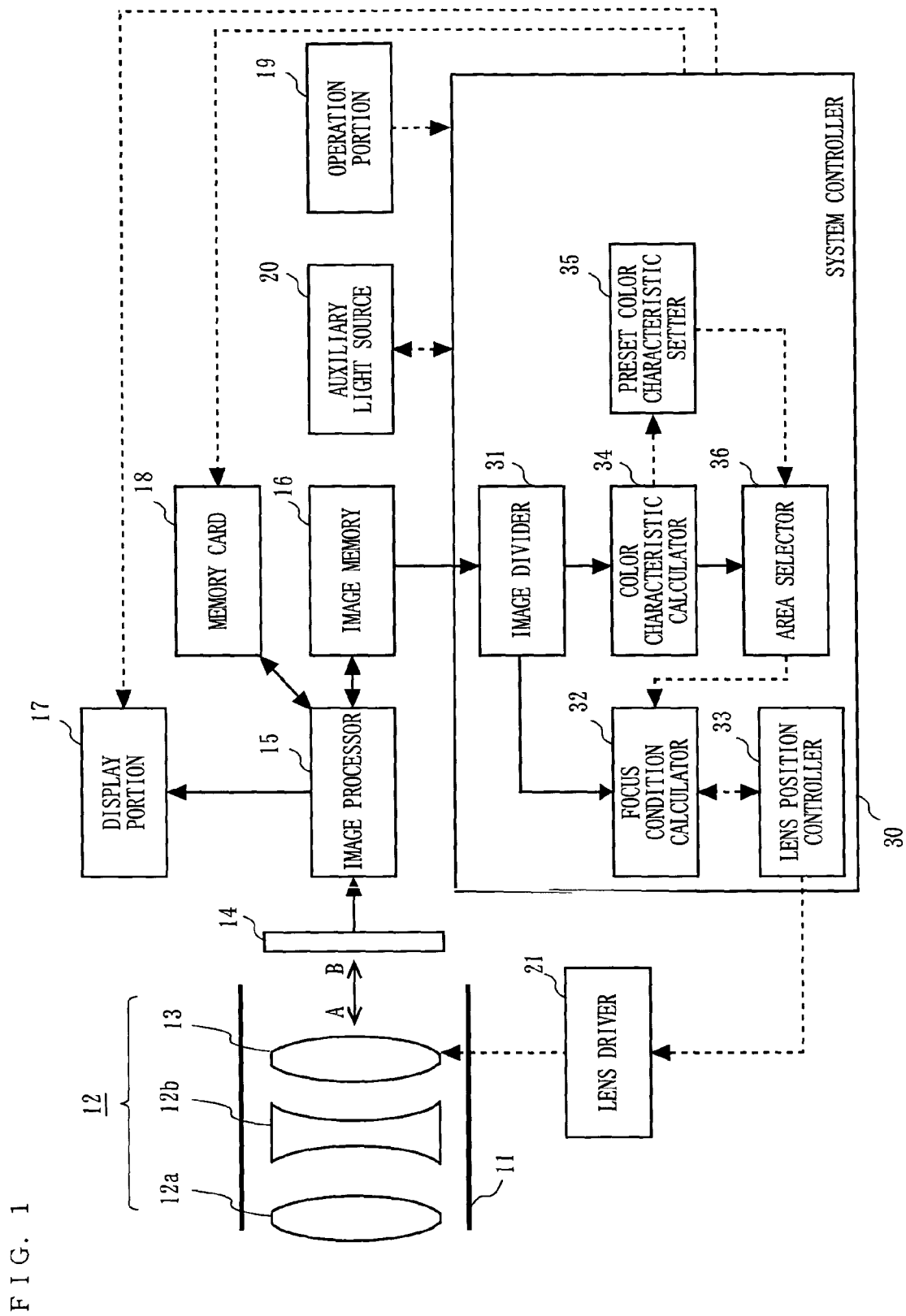
FIG. 1 is a block diagram of an imaging apparatus according to a first embodiment.

FIG. 1 is a block diagram of an imaging apparatus according to a first embodiment. The imaging apparatus according to the first embodiment includes a lens barrel 11, a zoom lens system 12 as an imaging optical system, a CCD 14 as an image sensor, an image processor 15, an image memory 16, a display portion 17, an operation portion 19, an auxiliary light source 20, a lens driver 21 and a system controller 30.

The lens barrel 11 holds the zoom lens system 12 inside. The zoom lens system 12 is an imaging optical system that forms an optical image of the object so that the magnification is variable. The zoom lens system 12 comprises from the object side: a zoom lens unit 12a and a zoom lens unit 12 b that move along the optical axis in zooming and a focusing lens unit 13 that moves along the optical axis for the adjustment to the in-focus state.

The CCD 14 is an image sensor that captures at predetermined timing the optical image formed by the zoom lens system 12, converts the captured image into an electric image signal, and outputs the signal. The image processor 15 is a processor that performs predetermined image processing such as white balance correction and gamma correction on the image signal outputted from the CCD 14. The image memory 16 temporarily stores the image signal outputted from the image processor 15.

The display portion 17, which is typically a liquid crystal display, receives through the image processor 15 the image signal outputted from the CCD 14 or the image signal stored in the image memory 16 and displays this image signal to the user as a visible image based on an instruction from the system controller 30 described later. The image processor 15 is bidirectionally accessible to a memory card 18 that is detachably attachable by the user. The memory card 18 receives through the image processor 15 the image signal outputted from the CCD 14 or the image signal stored in the image memory 16 and stores the image signal, or outputs the stored image signal to the image memory 16 through the image processor 15 so as to be temporarily stored in the image memory 16 based on an instruction from the system controller 30 described later.

The operation portion 19 is provided outside the imaging apparatus body, and comprises buttons used for the user to perform settings or operations of the imaging apparatus body. Details of the operation portion 19, which includes a plurality of operation buttons, will be described later by use of FIG. 2. The auxiliary light source 20, which is typically an LED, is a light emitting device that lights up toward the object based on an instruction from the system controller 30 described later when the shooting environment is dark.

The lens driver 21 outputs a driving signal that drives the focusing lens unit 13 in the direction of the optical axis (the direction A or B) based on an instruction from a lens position controller 33 of the system controller 30 described later.

The system controller 30 is implemented by a semiconductor integrated circuit, and includes an image divider 31, a focus condition calculator 32, the lens position controller 33, a color characteristic calculator 34, a preset color characteristic setter 35 and an area selector 36. The image divider 31 performs the processing to divide the image signal outputted from the image memory 16 into a plurality of areas. The focus information calculator 32 calculates the defocus amount based on the contrast information of each area and the position information of the focusing lens unit 13 from the image signal divided into a plurality of areas by the image divider 31.

The lens position controller 33 generates a control signal for controlling the position of the focusing lens 13 based on the defocus amount outputted from the focus information calculator 32, and outputs the control signal to the lens driver 21. Moreover, the lens position controller 33 outputs, to the focus condition calculator 32, the position information when the focusing lens 13 is driven by the lens driver 21. At this time, the focus condition calculator 32 can calculate the defocus amount from the position information of the focusing lens 13 and the contrast information.

The color characteristic calculator 34 calculates the color characteristic of each area from the image signal divided into a plurality of areas by the image divider 31. The preset color characteristic setter 35 calculates, of the color characteristic of the areas outputted from the color characteristic calculator 34, the color characteristic of the area selected by the user, stores the color characteristic, and performs the preset color characteristic setting processing. The color characteristic calculator 34 which includes a nonvolatile memory is capable of holding the once stored preset color characteristic even when the power of the imaging apparatus body is turned off.

The area selector 36 performs the focus following imaging processing by comparing the color characteristic of each area outputted from the color characteristic calculator 34 with the color characteristic outputted from the preset color characteristic setter 35, selecting a substantially coinciding area and outputting the position of the selected area to the focus information calculator 32. That is, when the focus following imaging processing is performed, the preset color characteristic setter 35 reads out the stored color characteristic and outputs it to the area selector 36.

Figure 2:
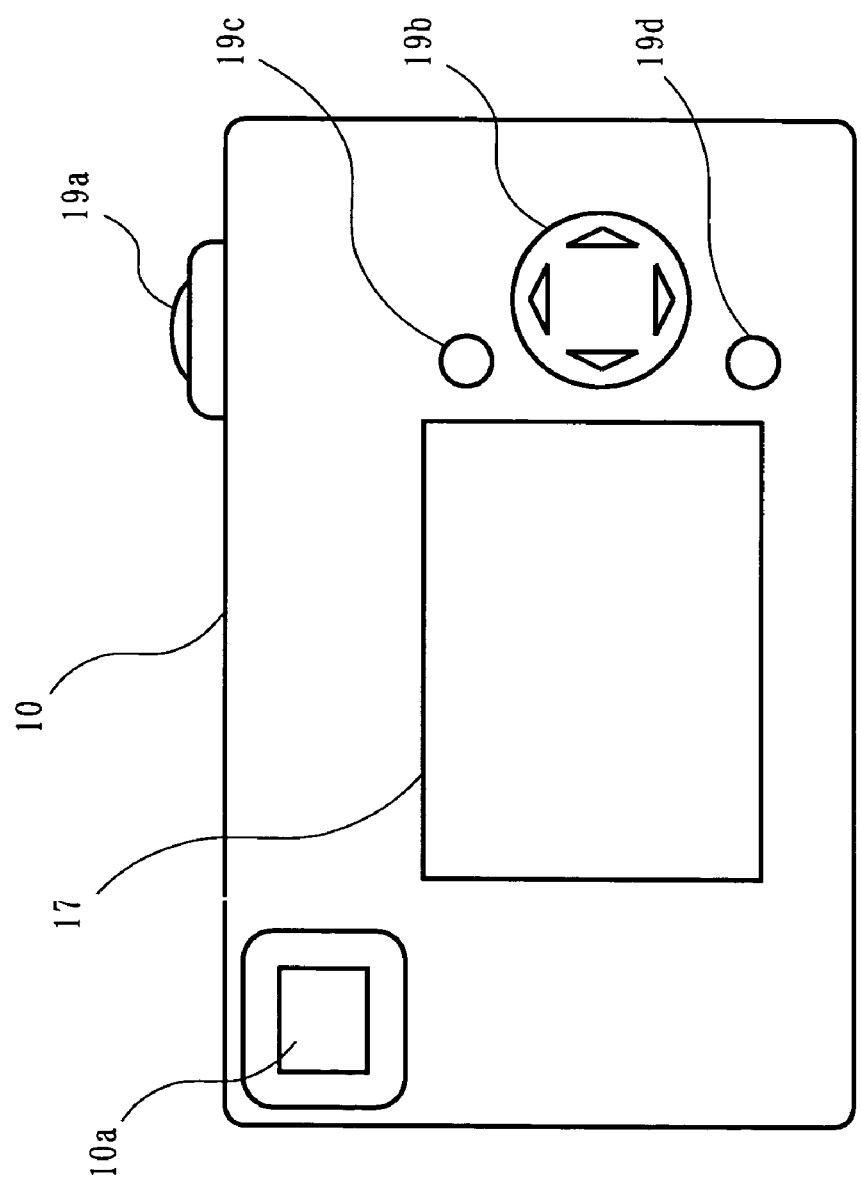
FIG. 2 is a schematic view showing the back side of the body of the imaging apparatus according to the first embodiment.

FIG. 2 is a schematic view showing the back side of the body of the imaging apparatus according to the first embodiment. The imaging apparatus according to the first embodiment includes the imaging apparatus body 10, the display portion 17, the operation portion 19 and a finder 10*a*.

The finder 10*a* is an optical system that optically directs the object image to the user's pupil. The display portion 17, which is a liquid crystal display as mentioned previously, displays the obtained image signal as a visible image to the user. The operation button 19 comprises a shutter button 19*a*, a cursor key 19*b*, an enter button 19*c* and a menu button 19*d*.

The shutter button 19*a* starts the focus following imaging processing by being half depressed by the user, and performs the operation to store the shot image into the memory card by being fully depressed by the user. The cursor key 19*b* is operated to select an item and its contents from the menus of various operation modes displayed on the display portion 17. The enter button 19*c* is operated for entering the contents selected by the cursor key 19*b*. The menu button 19*d* is operated for displaying the menus of typical operation modes of the imaging apparatus body.

The items of the menus of the operation modes include whether to start the processing to store the color characteristic of the image signal captured on the display portion 17 described later or not (preset color characteristic setting processing). When the user operates the menu button 19*d* to display the menu associated with the start of the preset color characteristic setting processing on the display portion 17, the cursor key 19*b* accepts the selection of the contents by the user's operation. When the user operates the cursor key 19*b* to select the start of the preset color characteristic setting processing and operates the enter button 19*c* under this condition, the preset color characteristic setting processing is started by the preset color characteristic setter 35.

Figure 3:
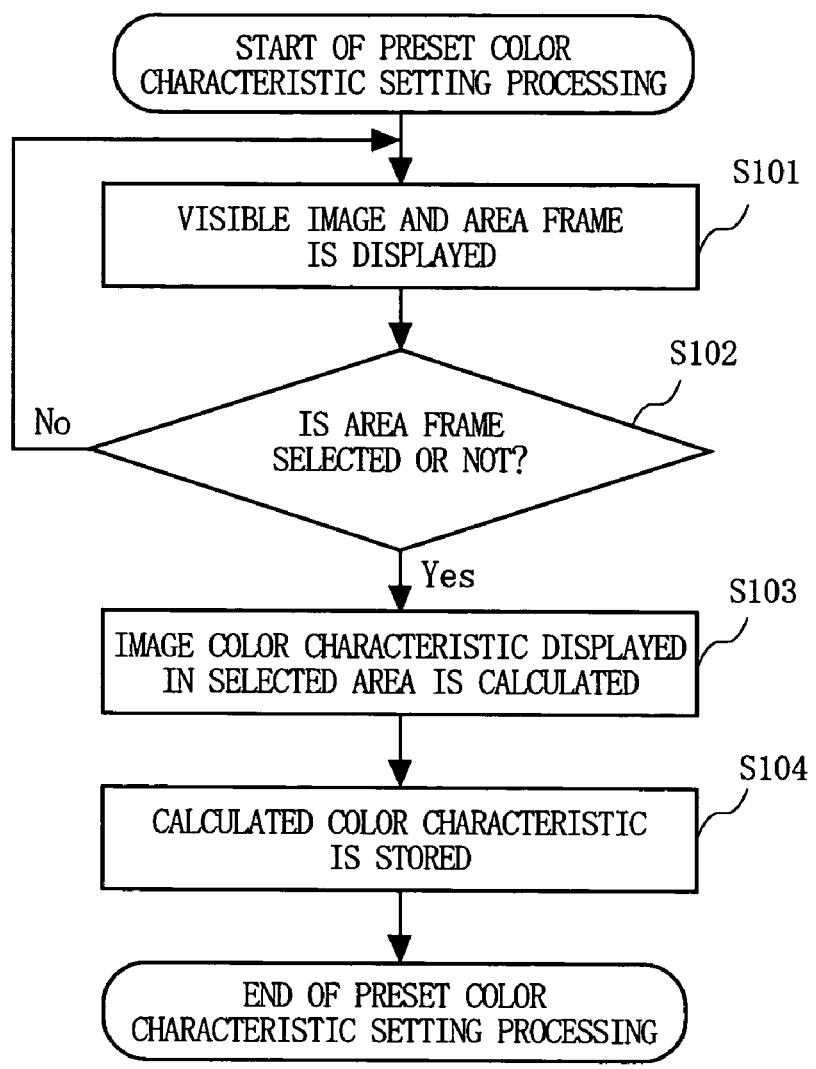
FIG. 3 is an operation flowchart of preset color characteristic setting of the object according to the first embodiment.
Figure 4:
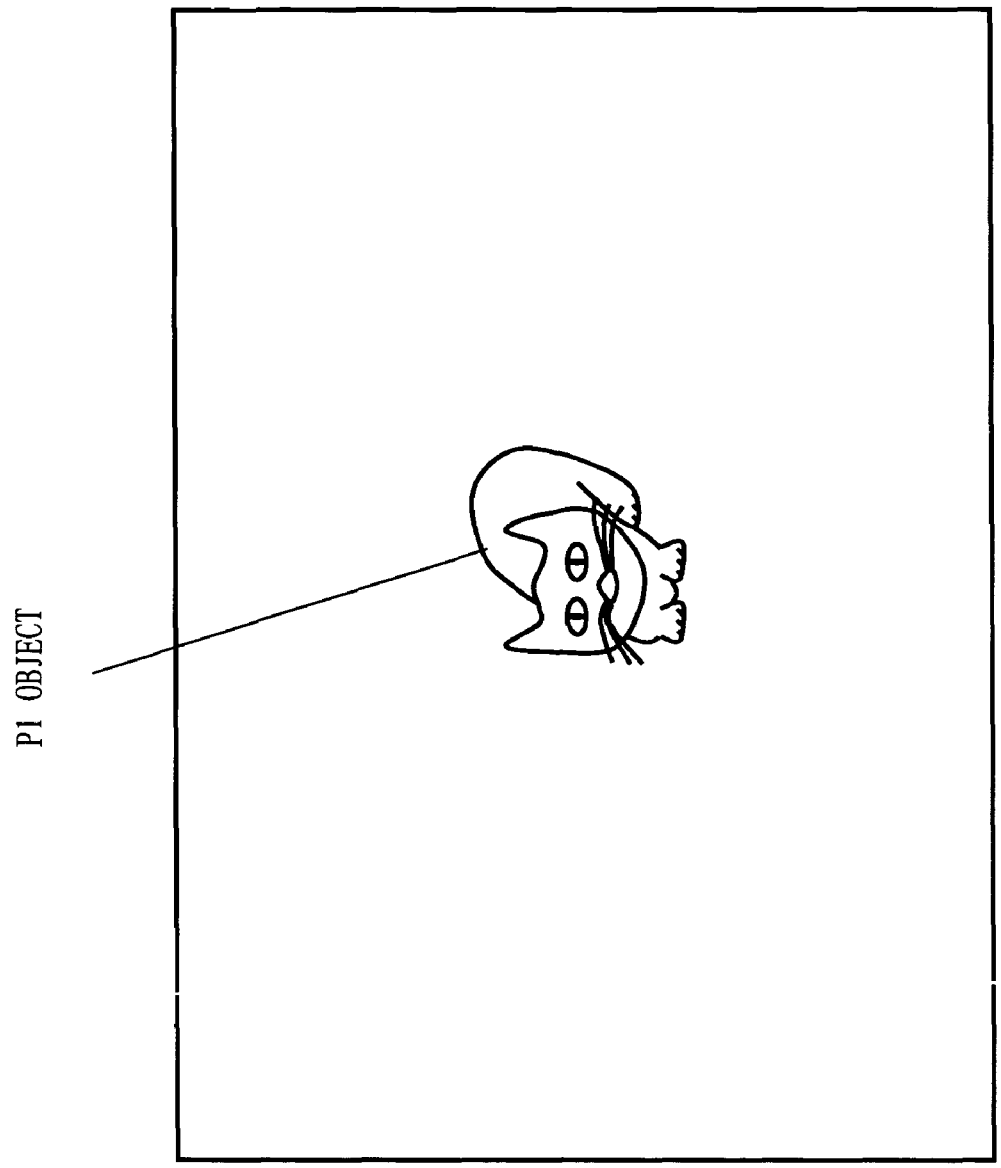
FIG. 4 is a brief view of a display portion where an object is shown in the center according to the first embodiment.
Figure 5:
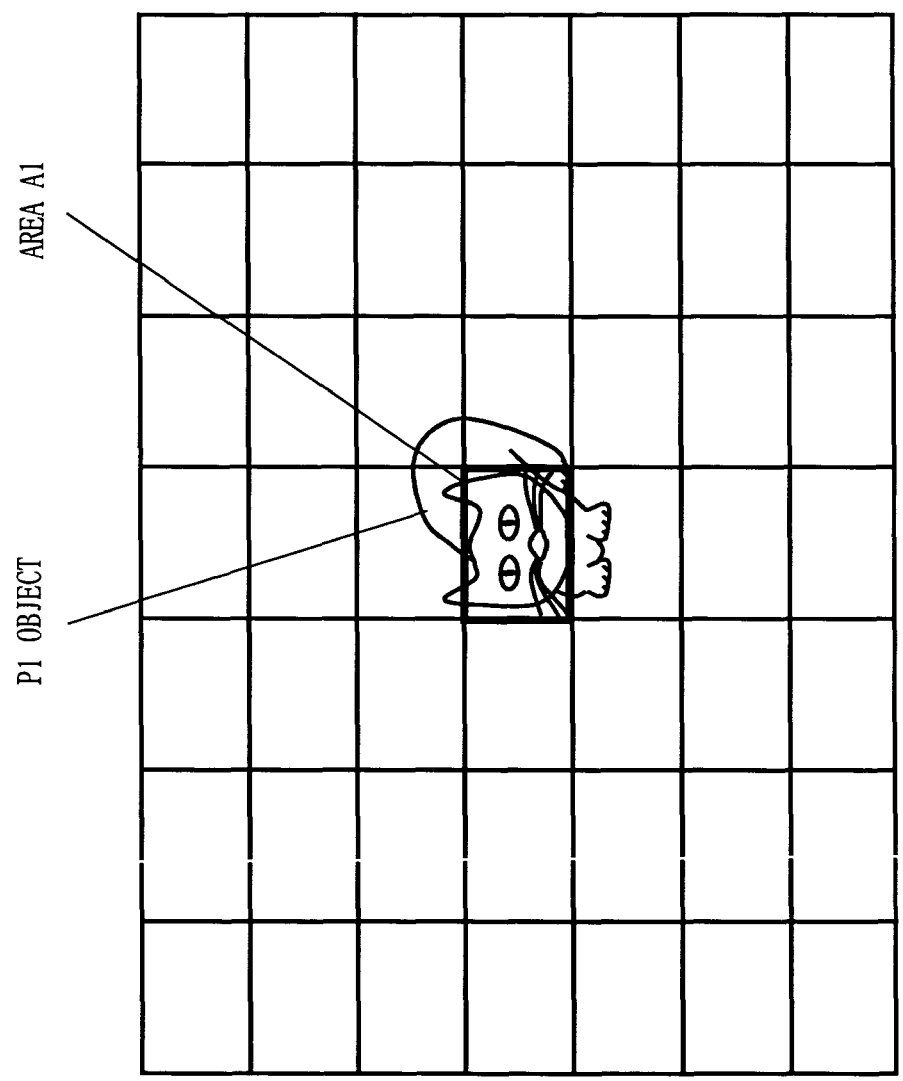
FIG. 5 is a brief view of the display portion where the object is shown in the center together with area frames according to the first embodiment.

FIG. 3 is an operation flowchart of the preset color characteristic setting of the object according to the first embodiment. The flowchart shown in FIG. 3 shows the operation flow of a program that runs on the system controller 30. FIG. 4 is a brief view of the display portion where an object is shown in the center according to the first embodiment, and shows an example in which the object P1 is shown in the center of the display portion 17. FIG. 5 is a brief view of the display portion where the object is shown in the center together with area frames according to the first embodiment, and shows an example in which 7×7 area frames are displayed together with the object P1. When the mode to refer to the color characteristic is set by the menu button 19*d* and the enter button 19*c*, the processing is started with the start of the preset color characteristic setting processing.

At step S101, the image signal obtained by the CCD 14 is outputted from the image processor 15, and a visible image and the area frames are displayed on the display portion 17. At this time, the display condition of the image displayed on the display portion 17 is such that the visible image and the area frames are superimposed on each other as shown in FIG. 5. The image signal inputted from the image memory 16 to the image divider 31 of the system controller 30 is divided into the areas.

At step S102, the process waits for the input as to whether an area frame is selected or not. At this time, a specific area is surrounded by a thick frame to indicate that this area is selectable. The user can move the area of the thick frame by the cursor key 19*b*. For example, when the user moves the area of the thick frame to the center and presses the enter button 19*c*, the area A1 in the center is selected, and the process proceeds to step S103.

At step S103, the color characteristic calculator 34 calculates the divisional image color characteristic displayed in the selected area (here, the area of the thick frame), and the process proceeds to step S104.

At step S104, the preset color characteristic setter 35 stores the calculated color characteristic, and the preset color characteristic setting processing is ended.

FIG. 6 shows arithmetic expressions of the hue and chroma information according to the first embodiment. The principle of the calculation of the hue and chroma information by the color characteristic calculator 34 described at step S103 will be described. Description will be given with the image signal divided into red (hereinafter, referred to as R), green (hereinafter, referred to as G) and blue (hereinafter, referred to as B) and R, G and B each having 256 levels.

The calculation of the hue and chroma information is performed by the color characteristic calculator 34. First, the color characteristic calculator 34 obtains the highest values of R, G and B for the divisional image signal outputted from the image divider 31, and the obtained maximum values are designated V (expression 1). Then, the color characteristic calculator 34 obtains the lowest values for the divisional image signal outputted from the image divider 31, and the differences when the obtained lowest values are subtracted from V are designated d (expression 2). Further, the color characteristic calculator 34 obtains the chroma S from V and d (expression 3).

When the chroma S=0, the color characteristic calculator 34 sets the hue H=0 (expression 4). When the chroma S is a value other than 0, the color characteristic calculator 34 calculates the hue by performing a predetermined processing (expressions 5 to 7). Here, the predetermined processing is to obtain the hue H by the expression 5 when the highest values of R, G and B are equal to R, obtain the hue H by the expression 6 when the highest values are equal to G and obtain the hue H by the expression 7 when the highest values are equal to B.

Lastly, when the obtained hue H is a negative value, the color characteristic calculator 34 adds 360 to convert the hue H into a positive value (expression 8). In this manner, the color characteristic calculator 34 calculates the hue and chroma information of the divisional image signal by computation.

Figure 7:
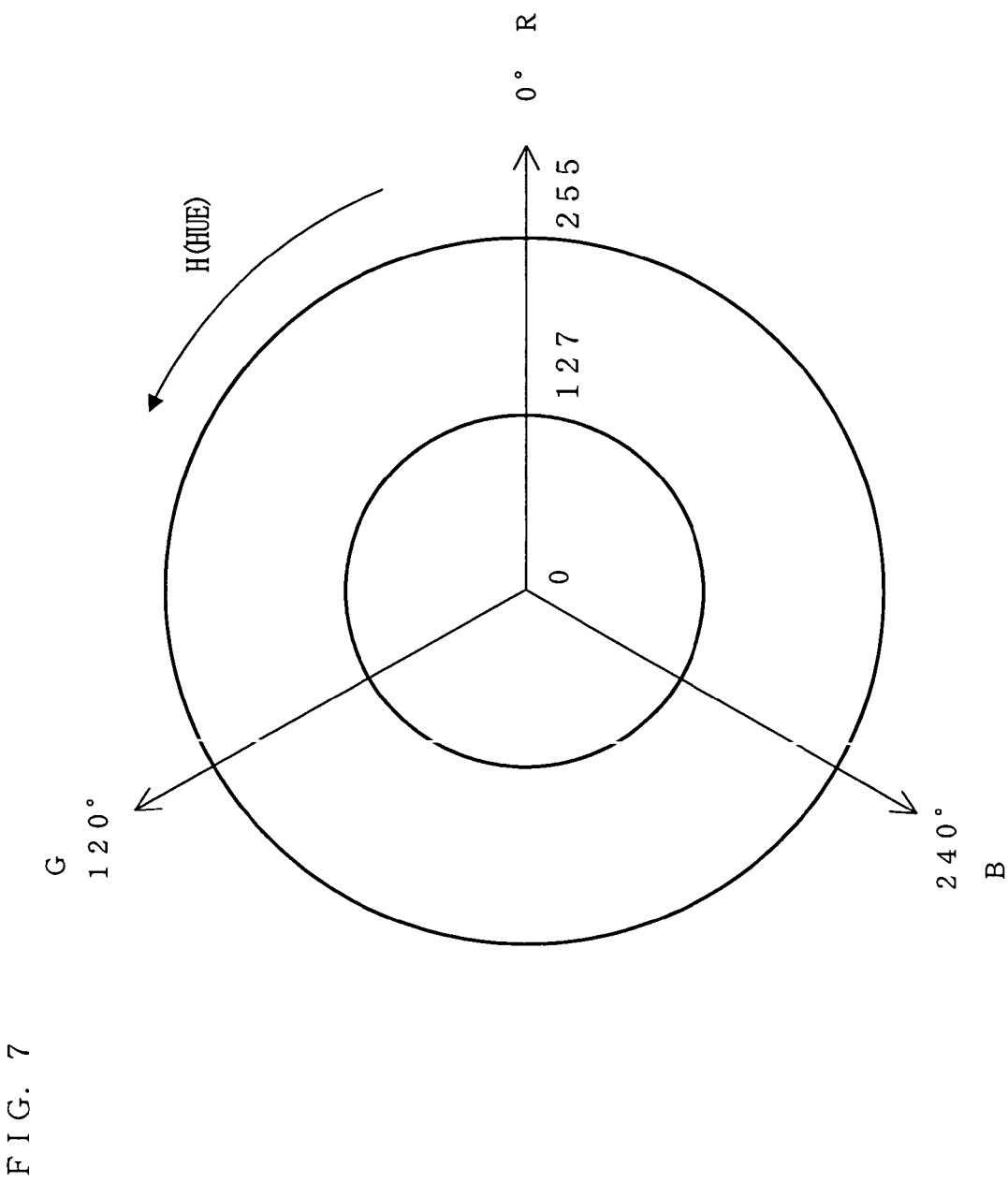
FIG. 7 is a chart of the hue and chroma information according to the first embodiment.

FIG. 7 is a chart of the hue and chroma information according to the first embodiment. In FIG. 7, the chroma S corresponds to the radial direction of the chart, and is plotted so as to increase in a range of 0 to 255 toward the periphery with the center S=0. Moreover, in FIG. 7, the hue H corresponds to the rotation direction, and is expressed as values 0 to 359 along the rotation direction.

For example, when the color characteristic of the divisional image signal is R=250, G=180 and B=120, by using the above-mentioned expressions, the color characteristic calculator 34 obtains V=250, d=250−120=130, the chroma S=130×255/250=133 and the hue H=(180−120)×60/133=27 from the expressions.

As described above, the color characteristic calculator 34 calculates the chroma and hue of the divisional image signal. The calculated chroma and hue are outputted to the preset color characteristic setter 35 as the preset color characteristic and stored therein. Next, a reference neighboring area that is set adjacent to the preset color characteristic will be described.

The preset color characteristic calculated by the color characteristic calculator 34 is stored in the preset color characteristic setter 35, and is referred to whenever necessary and used as the reference for determining the color characteristic of the object to be shot. Generally, there are cases where even when the same object is shot, the obtained color characteristic slightly varies because of factors such as the illumination light and the exposure time. Therefore, when the preset color characteristic is compared with the color characteristic of the object to be shot, it is preferable to determine the sameness with a predetermined permissible range given to the preset color characteristic. The predetermined permissible range of the preset color characteristic will be referred to as the reference neighboring area.

Figure 8:
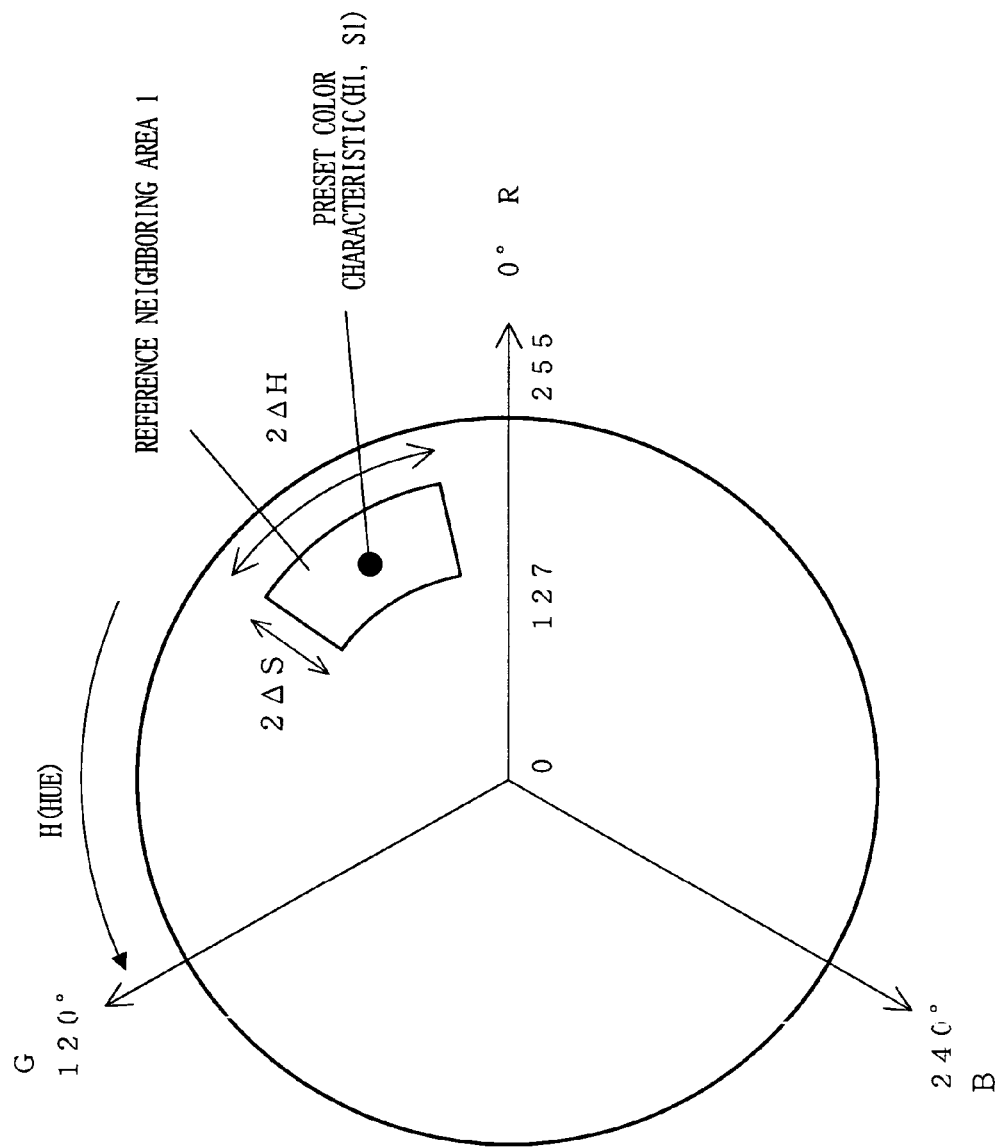
FIG. 8 is a chart of the hue and chroma information showing preset color characteristic and a reference neighboring area 1 according to the first embodiment.

An example in which the reference neighboring area is calculated will be shown. FIG. 8 is a chart of the hue and chroma information showing preset color characteristic and a reference neighboring area 1 according to the first embodiment. In FIG. 8, the point plotted as the preset color characteristic (H1, S1) corresponds to the color characteristic stored in the preset color characteristic setter 35. The preset color characteristic represents, as an example, the hue H=27 (=H1) and the chroma S=130 (=S1) obtained when R=250, G=180 and B=120 which values are previously calculated.

The reference neighboring area 1 defines the permissible ranges of the stored preset color characteristic (H1, S1). When the permissible range ΔH of the hue is 10 and the permissible range ΔS of the chroma is 30, in the reference neighboring area 1, the hue corresponds to the area of H1±10 and the chroma corresponds to the area of S1±30, and the reference neighboring area 1 is an area surrounded by two arcs and two radial line segments in FIG. 8.

Figure 9:
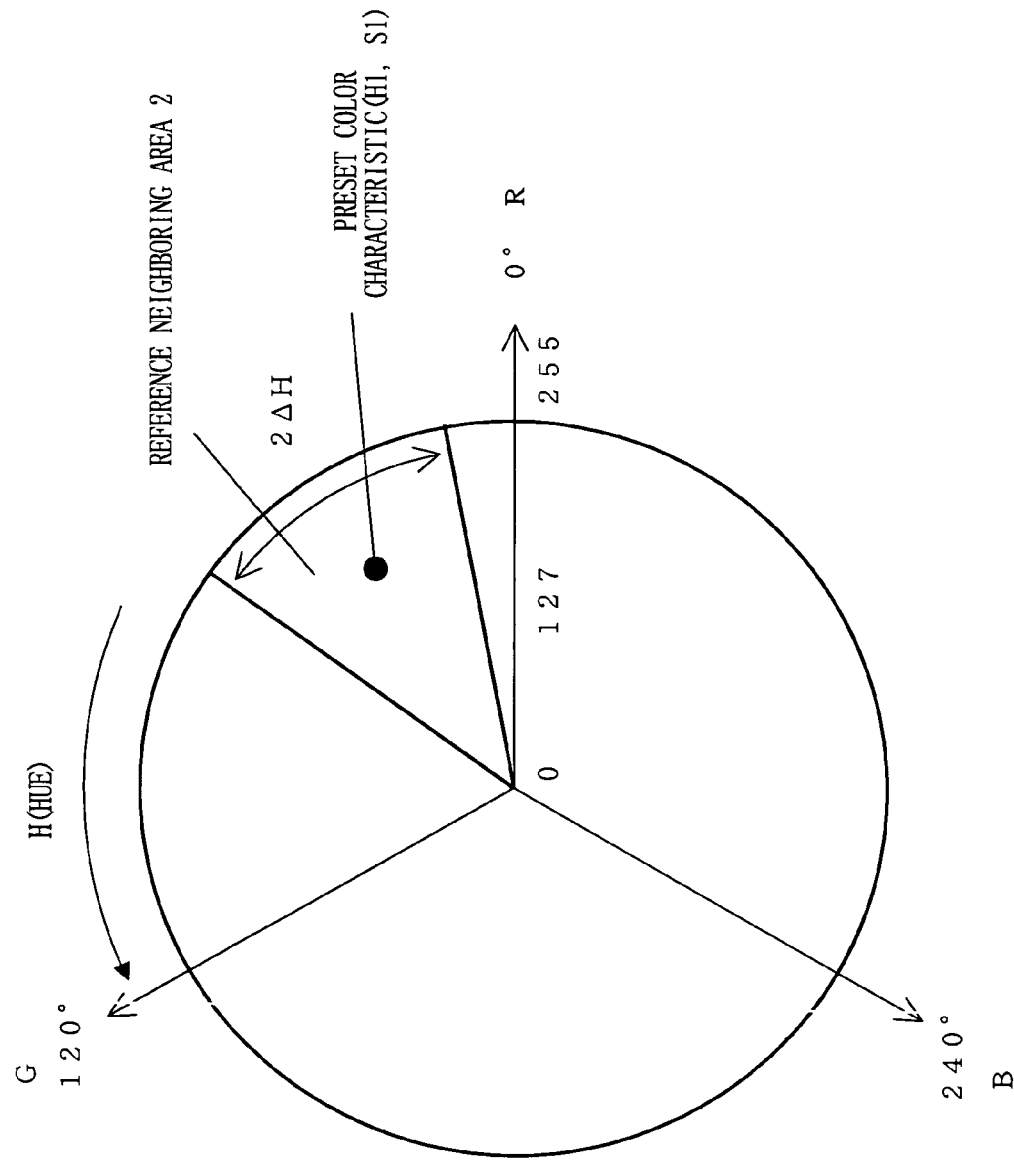
FIG. 9 is a chart of the hue and chroma information showing the preset color characteristic and a reference neighboring area 2 according to the first embodiment.

FIG. 9 is a chart of the hue and the chroma showing preset color characteristic and a reference neighboring area 2 according to the first embodiment. In FIG. 9, the point plotted as the preset color characteristic (H1, S1) corresponds to the color characteristic stored in the preset color characteristic setter 35. The preset color characteristic represents, as an example, the hue H=27 (=H1) and the chroma S=130 (=S1) obtained when R=250, G=180 and B=120 which values are previously calculated.

The reference neighboring area 2 is defined by the permissible range ΔH of the hue in the entire chroma range of 0 to 255. That is, in the reference neighboring area 2, the hue corresponds to the area of H1±10, and the reference neighboring area 2 is a fan-shaped area surrounded by an arc and radial line segments in FIG. 9.

While the permissible range of the hue is uniform in both of the above-described two examples, the present invention is not limited thereto. In cases such as when an auxiliary light source is used, by correcting the range of the color characteristic referred to based on the hue information of the light source, the reference range can be accurately defined even when the imaging apparatus is used in a dark environment. For example, in the case of a red auxiliary light source using an LED or the like, the correction can be made by shifting H1 toward 0.

While the color characteristic of the shot object is stored in the preset color characteristic setter 35 in the above-described two examples, the present invention is not limited thereto. For example, some pieces of preset color characteristic such as the skin color may be previously stored in the imaging apparatus body.

Figure 10:
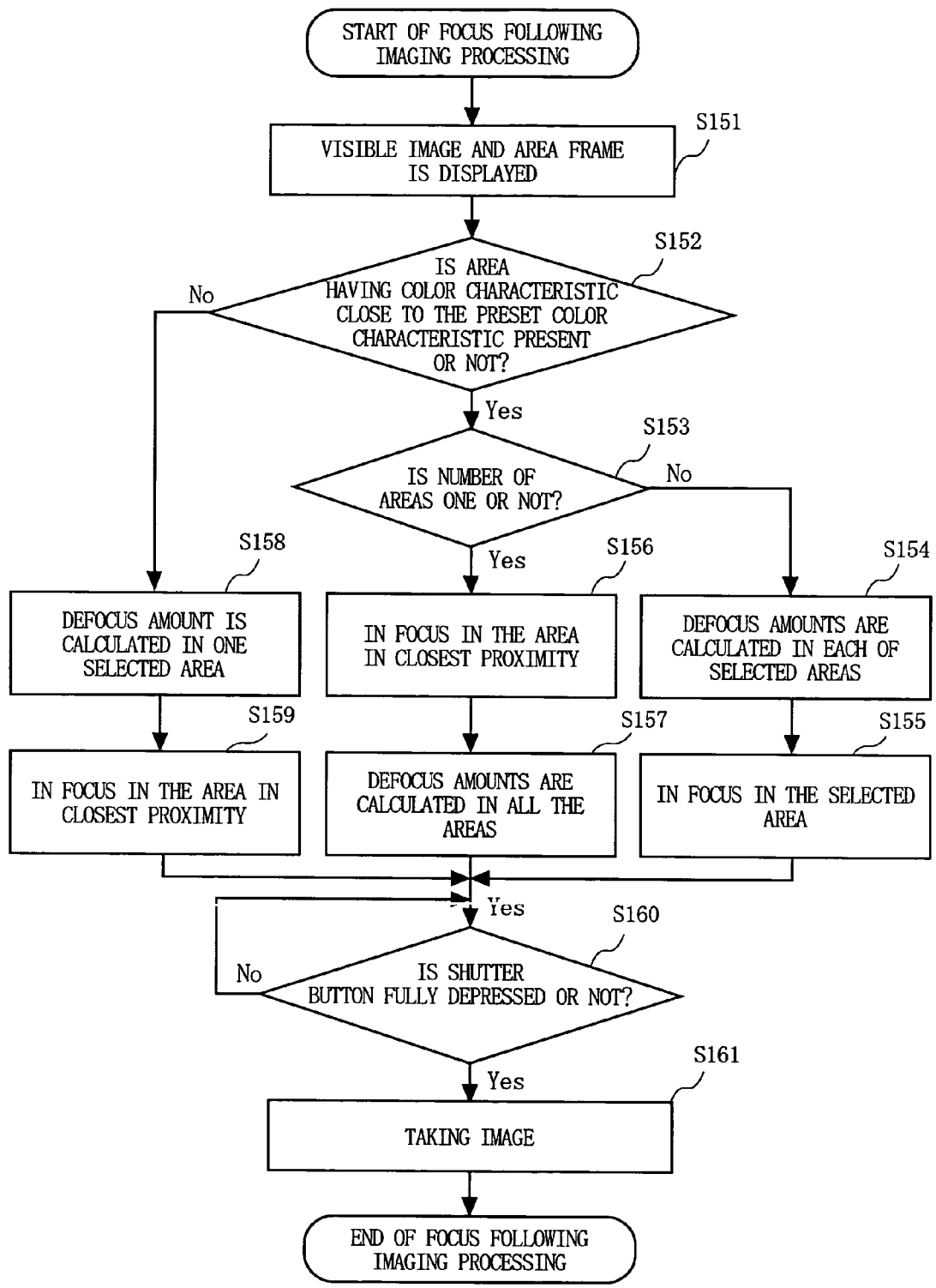
FIG. 10 is an operation flowchart of a focus following imaging processing according to the first embodiment.
Figure 11:
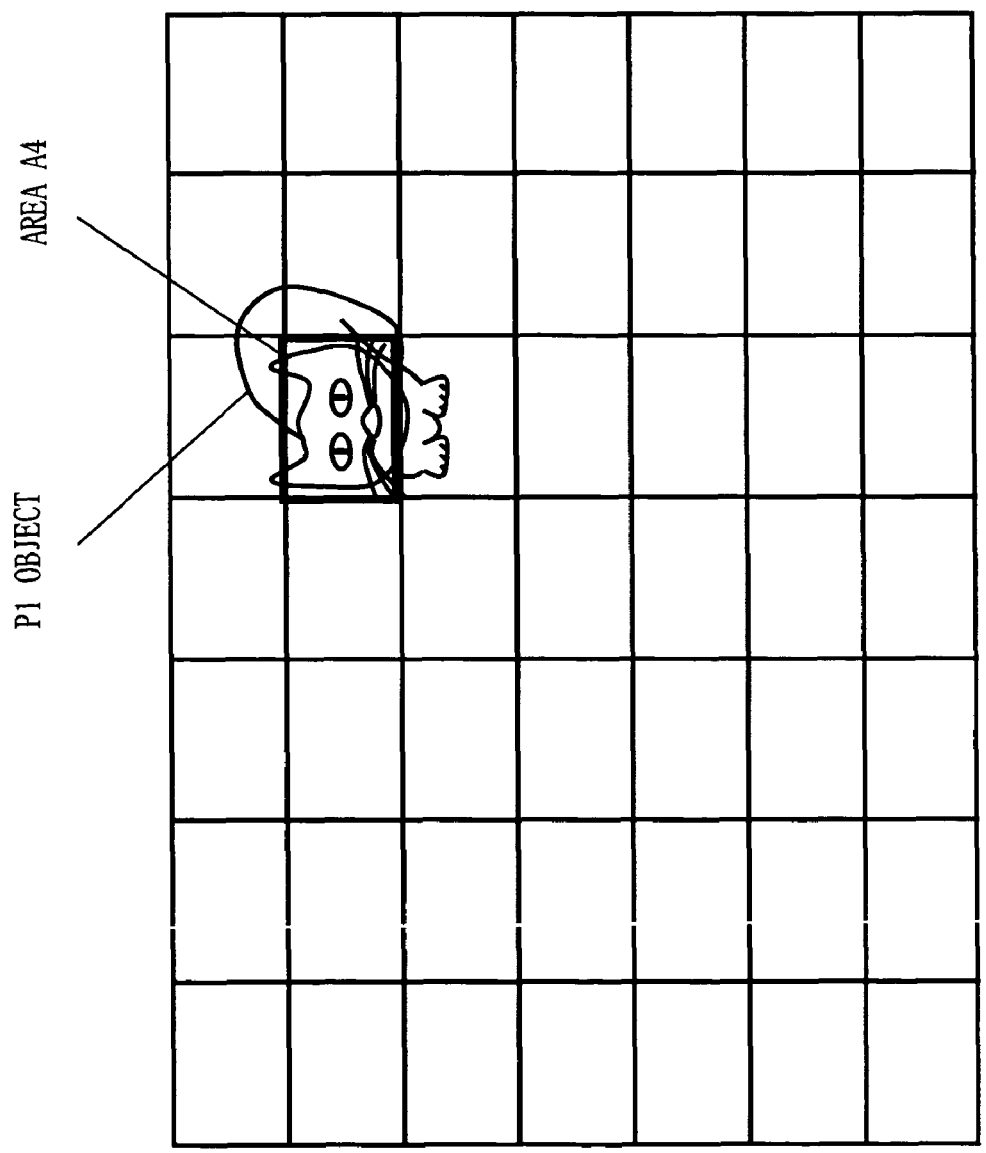
FIG. 11 is a brief view of the display portion where an object and the area frames are shown according to the first embodiment.
Figure 12:
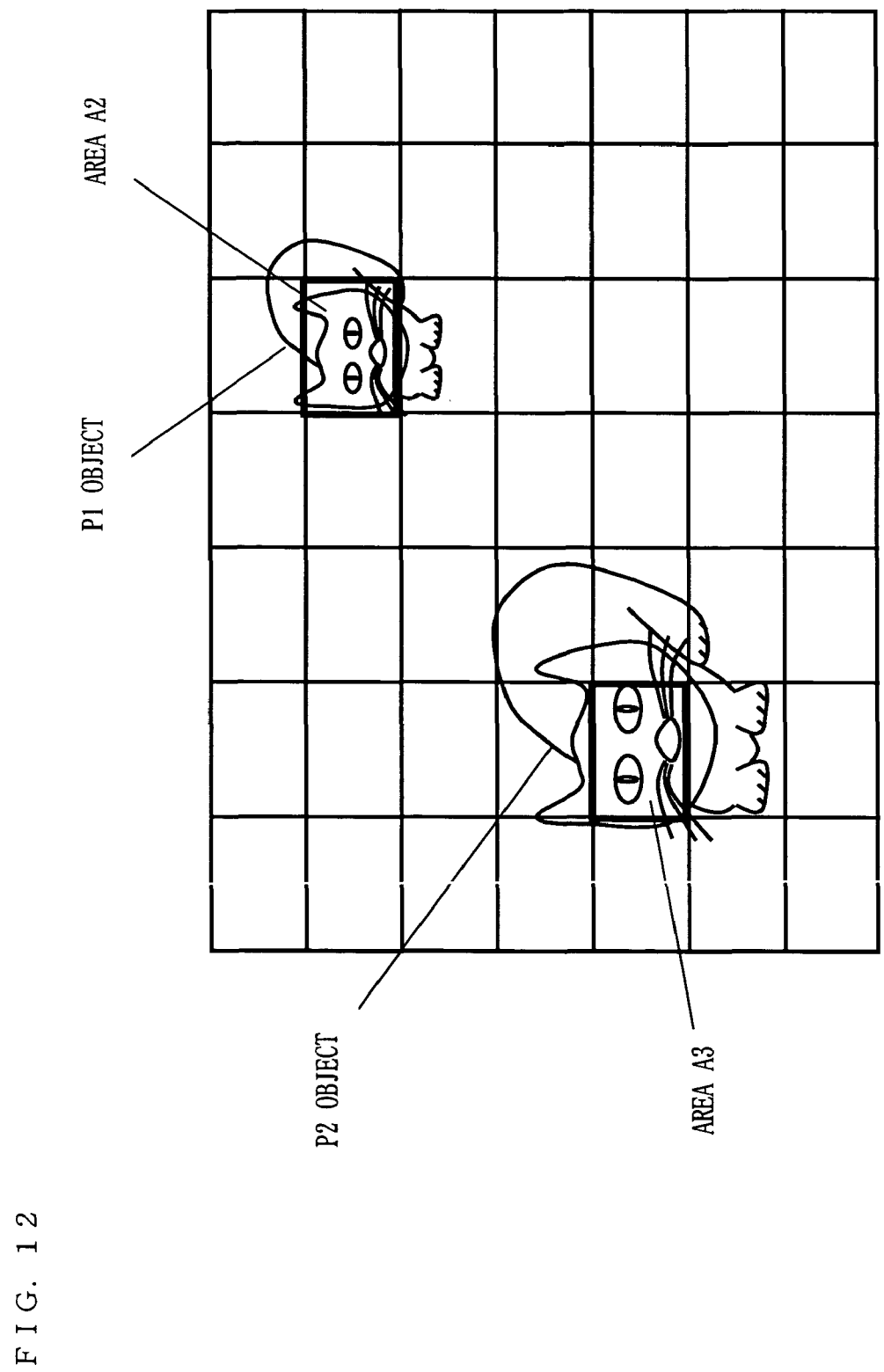
FIG. 12 is a brief view of the display portion where two objects and the area frames are shown according to the first embodiment.

FIG. 10 is an operation flowchart of the focus following imaging processing according to the first embodiment. FIG. 11 is a brief view of the display portion where an object and the area frames are shown according to the first embodiment. FIG. 12 is a brief view of the display portion where two objects and the area frames are shown according to the first embodiment. Referring to FIGS. 10 to 12, the focus following imaging processing of the imaging apparatus according to the first embodiment will be described.

The operation flowchart shown in FIG. 10 shows the flow of a program that runs on the system controller 30. In FIG. 10, when the shutter button 19a is half depressed by the user, the focus following imaging processing is started.

At step S151, the image signal obtained by the CCD 14 and having undergone the predetermined image processings at the image processor 15 is displayed together with the area frames on the display portion 17. At this time, an object P1 and 7×7 area frames are displayed on the display portion 17 as shown in FIG. 11.

Then, at step S152, the reference neighboring area is calculated by either of the methods described above with reference to FIGS. 8 and 9 based on the preset color characteristic stored in the preset color characteristic setter 35, and it is determined whether the color characteristic of each area outputted from the color characteristic calculator 34 is within the reference neighboring area or not. When an area having color characteristic close to the preset color characteristic is present, the process proceeds to step S153, and when such an area is absent, the process proceeds to step S158.

At step S153, it is determined whether the number of areas having color characteristic close to the preset color characteristic is one or not. When the number is one, the process proceeds to step S156, and when the number is two or larger, the process proceeds to step S154.

In the example using FIG. 11, the number of areas having color characteristic close to the preset color characteristic is one (area A4), and the process proceeds to step S156. At step S156, the focusing lens unit 13 is driven in the direction A or B of FIG. 1 by the focus information calculator 32, the lens position controller 33 and the lens driver 21. Then, from the focus position and the contrast signal generated from the image signal, the focus information calculator 32 calculates the focus position (in-focus position) where the contrast value is highest in the area A1, and outputs a control signal to the lens position controller 33.

At step S157, an operation is performed to bring the focusing lens 13 in focus in the selected area (area A1) by the lens position controller 33 and the lens driver 21 by the defocus amount to the in-focus position obtained by the focus information calculator 32 at step S156, and the process proceeds to the next step S160.

In the example using FIG. 12, the number of areas having color characteristic close to the preset color characteristic is two (areas A2 and A3), and the process proceeds to step S154. At step S154, the focusing lens unit 13 is driven in the direction A or B of FIG. 1 by the focus information calculator 32, the lens position controller 33 and the lens driver 21. Then, from the focus position and the contrast signal generated from the image signal, the focus information calculator 32 calculates the focus position (in-focus position) where the contrast value is highest in each of the areas A2 and A3, and outputs a control signal to the lens position controller 33.

At step S155, of the defocus amounts to the in-focus position of the areas obtained by the focus information calculator 32 at step S154, the area in the closest proximity (in this example, the area A3) is selected, and an operation to bring the focusing lens 13 in focus in the selected area (area A3) is performed by the lens position controller 33 and the lens driver 21, and the process proceeds to the next step S160. While an example is described in which the focusing lens 13 is brought in focus in the area in the closest proximity, the focusing lens 13 may be brought in focus with priority given to an area in the vicinity of the center.

When an area having color characteristic close to the preset color characteristic is absent at step S152, the process proceeds to step S158. At step S158, the focusing lens unit 13 is driven in the direction A or B of FIG. 1 by the focus information calculator 32, the lens position controller 33 and the lens driver 21. Then, from the focus position and the contrast signal generated from the image signal, the focus information calculator 32 calculates the focus position where the contrast value is highest in all the areas.

At step S159, of the defocus amounts to the in-focus position of the areas obtained by the focus information calculator 32 at step S158, the area in the closest proximity is selected, and an operation to bring the focusing lens 13 in focus in the selected area is performed by the lens position controller 33 and the lens driver 21, and the process proceeds to the next step S160. While an example is described in which the focusing lens 13 is brought in focus in the area in the closest proximity, the focusing lens 13 may be brought in focus with priority given to an area in the vicinity of the center.

At step S160, it is determined whether the shutter button 19a is fully depressed or not, and when the shutter button 19a is fully depressed, the process proceeds to the next step S161. When the user takes his or her finger off the shutter button 19a, the above processing is all reperformed. At step S161, the imaging processing to store the image signal outputted from the image memory 16 or the image processor 15 into the memory card is performed based on an instruction from the system controller 30 at the timing when the shutter button 19a is fully depressed, and the focus following imaging processing is ended.

As described above, according to the imaging apparatus of the first embodiment, since the focus adjustment is performed in accordance with the color characteristic of the object which can be arbitrarily set, the object that the user intends to bring into focus can be easily followed for focusing. At this time, the color characteristic of the object can be arbitrarily set by the user, so that the function of the imaging apparatus can be improved. Moreover, since the color characteristic comprises the hue and the chroma, the object that the user intends to bring in focus can be easily followed for focusing without any influence of the brightness.

While an example using 7×7 area frames is described in the first embodiment, the setting of the area frames is arbitrary and the area frames may be set as appropriate. For example, a plurality of area frames may be disposed in the vicinity of the center of the display portion 17, or a single area frame may be disposed there.

Second Embodiment

Figure 13:
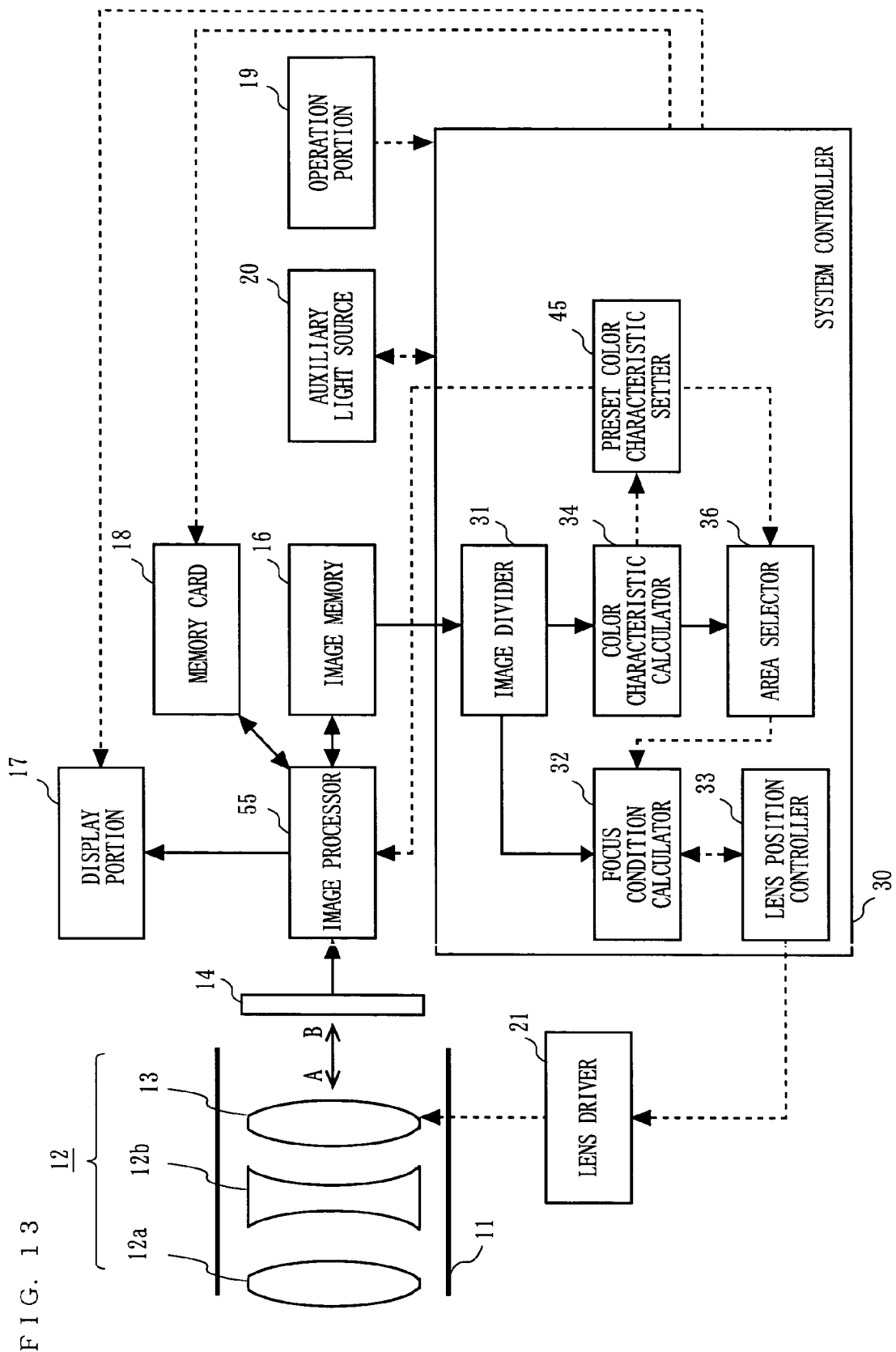
FIG. 13 is a block diagram of an imaging apparatus according to a second embodiment.

FIG. 13 is a block diagram of an imaging apparatus according to a second embodiment. Since the schematic structure of the imaging apparatus according to the second embodiment is the same as that of the imaging apparatus according to the first embodiment, the elements that function similarly to those of FIG. 1 are denoted by the same reference numerals and detailed descriptions thereof are omitted.

In FIG. 13, when the preset color characteristic setting processing is performed, a preset color characteristic setter 45 calculates and stores, of the color characteristic of the areas outputted from the color characteristic calculator 34 of the imaging apparatus according to the first embodiment, the color characteristic of the area selected by the user. When the focus following imaging processing is performed, the preset color characteristic setter 45 reads out the stored color characteristic and outputs it to the area selector 36. When the focus following imaging processing is performed, the preset color characteristic setter 45 further outputs correction information to an image processor 55. According to the imaging apparatus of the second embodiment, the focus accuracy for the object can be improved based on the color characteristic obtained by the color characteristic calculator 34 as described later.

Figure 14:
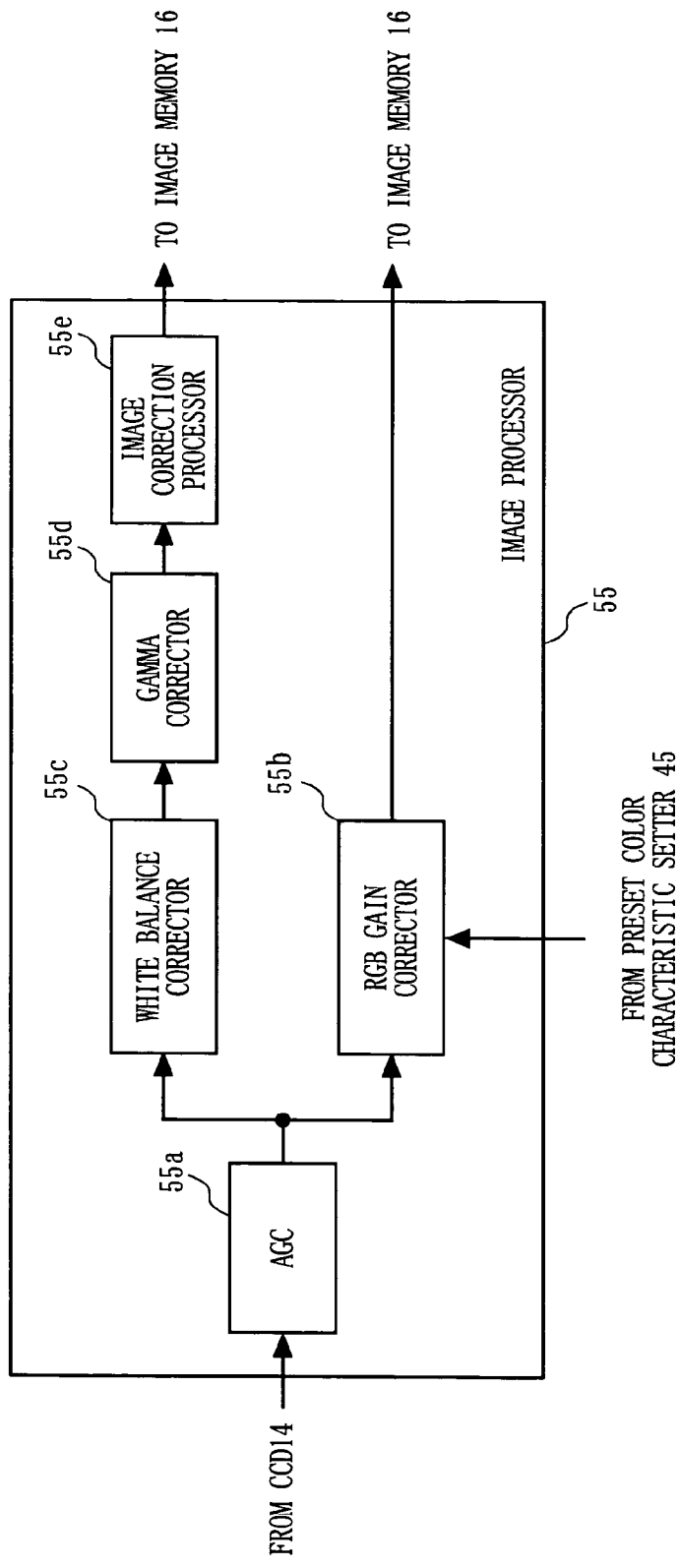
FIG. 14 is a detailed block diagram of an image processor according to the second embodiment.

FIG. 14 is a detailed block diagram of the image processor according to the second embodiment. In FIG. 14, the image processor 55 includes an AGC 55a, an RGB gain corrector 55b, a white balance corrector 55c, a gamma corrector 55d and an image correction processor 55e.

The AGC 55a is an AGC (auto gain control) circuit that automatically corrects the gain of the image signal obtained by the CCD 14. The white balance corrector 55c corrects the white balance of the obtained image signal. The gamma corrector 55d performs the gamma correction of the obtained image signal. The image correction processor 55e corrects flaws of pixels that are present in the image signal. The RGB gain corrector 55b corrects the gains of the colors R, G and B based on the correction information outputted from the preset color characteristic setter 45.

The pixel correction processor 55e outputs image information to the image memory 16, and the image signal is used for the storage in the memory card 18 at the time of imaging or for the display on the display portion 17. The RGB gain corrector 55b also outputs image information to the image memory 16, and the image signal is used for the calculation of the color characteristic for controlling the driving of the focusing lens 13 and the calculation of the contrast information.

Figure 15:
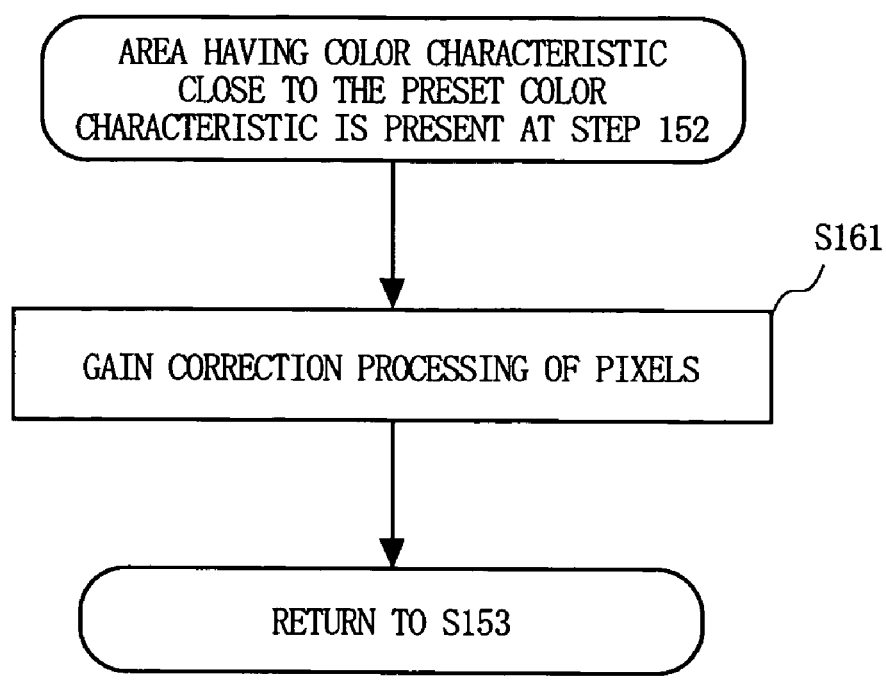
FIG. 15 is an operation flowchart of a focus following imaging processing according to the second embodiment.

FIG. 15 is an operation flowchart of the focus following imaging processing according to the second embodiment. The operation of the imaging apparatus according to the second embodiment will be described.

The operation flowchart (FIG. 10) of the focus following imaging processing of the imaging apparatus according to the second embodiment will be described as an example in which the processing of step S161 is added to the operation flowchart of the focus following imaging processing described in the first embodiment, and descriptions of the parts overlapping those described in the first embodiment are omitted. This operation flowchart similarly shows the flow of a program that runs on a system controller 50. Like in the first embodiment, when the shutter button 19a is half depressed by the user, the focus following imaging processing is started.

In the imaging apparatus according to the second embodiment, when an area having color characteristic close to the preset color characteristic is present at step S152, the process proceeds to step S161 shown in FIG. 15. In the imaging apparatus according to the second embodiment; the reference neighboring area 2 shown in FIG. 9 is defined. As an example, the chroma is in the entire range of 0 to 255, and the hue and the permissible range ΔH thereof are H1=0 and ΔH=30. The reference range of the permissible range of the hue is H=±30. That is, description will be given with a red color as the reference neighboring area 2.

At step S161, after the gain correction processing of pixels is performed, the process returns to step S153 in the flowchart (FIG. 10) of the first embodiment. The gain correction processing of the image which is a characteristic part of the imaging apparatus of the second embodiment will be described in detail.

The imaging apparatus according to the second embodiment is characterized in that two series of image processings are performed on the image signal outputted from the image sensor. That is, the white balance corrector 55c and the gamma corrector 55d of the image processor 55 corrects the levels of the colors of the image signal from the CCD 14 so that the shot image appears more natural and sharp. On the other hand, the RGB gain corrector 55b of the image processor 55 independently performs an image processing for focus adjustment to thereby correct the contrast information, used when the defocus amount is calculated, so that the object having the color that the user intends to shoot is easily brought into focus.

Figure 16:
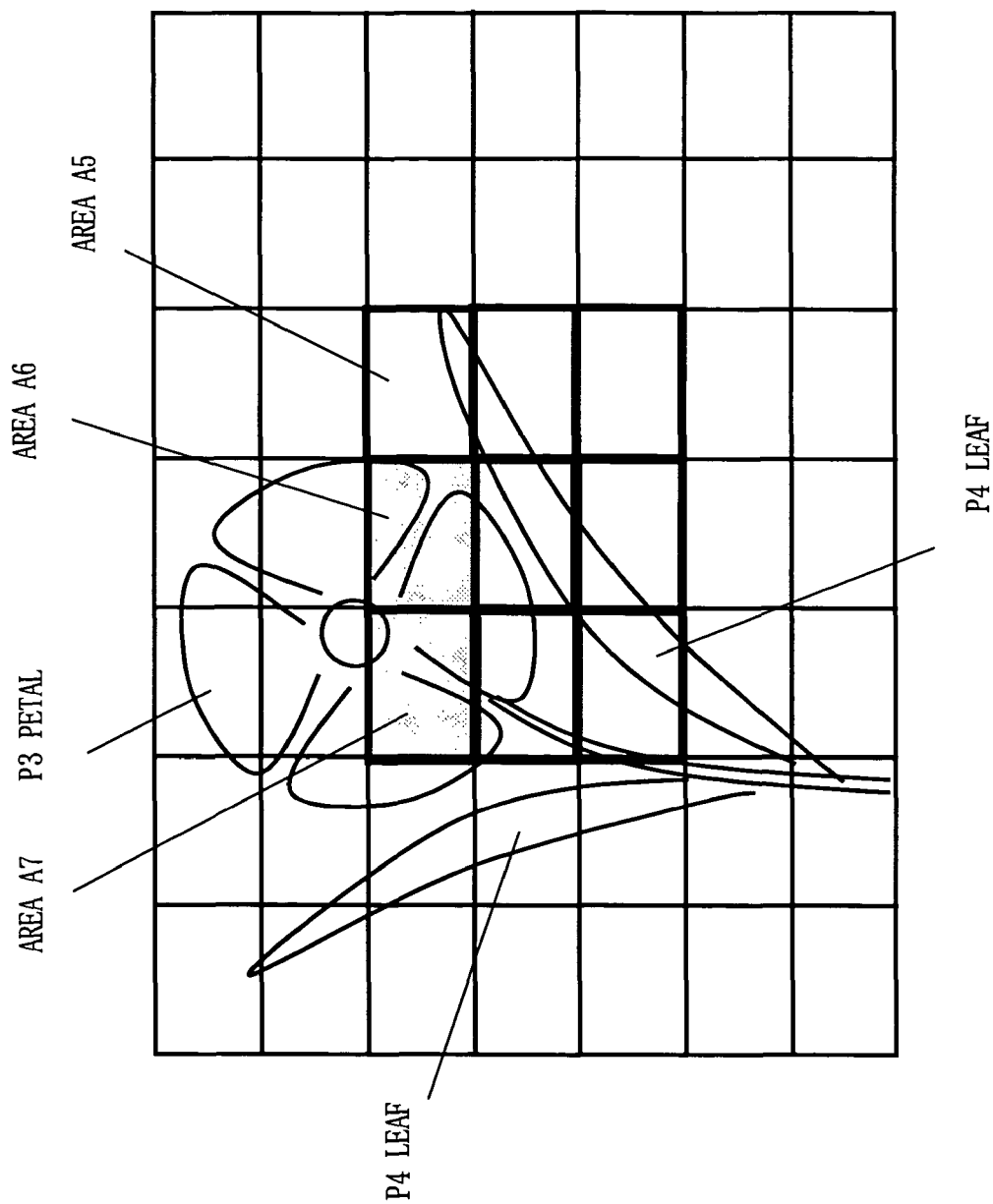
FIG. 16 is a brief view of the display portion where an object and the area frames are shown according to the second embodiment.

FIG. 16 is a brief view of the display portion where an object and the area frames are shown according to the second embodiment, and shows a condition in which the display portion 17 shows petals P3 having a red color and situated in front and leaves P4 having a green color and situated below as the object and shows 7×7 area frames together therewith.

Figure 17:
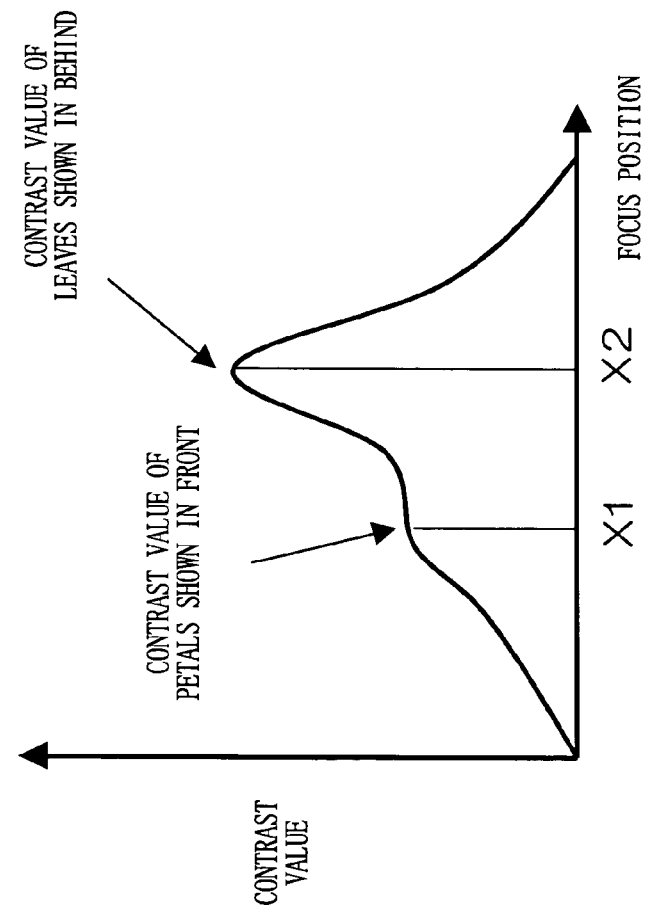
FIG. 17 is a characteristic view of the focus position and the contrast value before gain correction according to the second embodiment.

FIG. 17 is a characteristic view of the focus position and the contrast value before the gain correction according to the second embodiment, and shows the relationship between the focus position of the area A5 (including 3×3 area frames for which color characteristic is calculated, and an area frame for AF for which the average contrast information of the 3×3 area frames is calculated) of the object before the RGB gain correction and the average contrast value. As is apparent from FIG. 17, the focus position where the contrast value of the petals shown in front is high is X1, and the focus position where the contrast value of the leaves shown behind is X2.

Normally, the white balance corrector 55c and the gamma corrector 55d correct the levels of the colors of the image signal from the CCD 14 so that the shot image appears more natural and sharp. Therefore, when the characteristic of the focus position and the contrast value is obtained based on the image signal corrected by the white balance corrector 55c and the gamma corrector 55d, the object is not always in focus in the focus position intended by the user.

In the example of the object of FIG. 17, although the object that the user intends to bring in focus is the petals, the leaves having the higher contrast value and shown behind is in focus and the petals shown in front cannot be brought in focus.

Therefore, in the imaging apparatus according to the second embodiment, the preset color characteristic (the range of H=±30) intended by the user is previously stored in the preset color characteristic setter 45, and a processing is performed to compare the preset color characteristic with the color characteristic of each of the 3×3 areas in the area A5 calculated by the color characteristic calculator 34. When a coinciding area is present as a result of the comparison (in the example of FIG. 17, the coinciding area frames are A6 and A7), the preset color characteristic setter 45 outputs correction information to the image processor 55 so that the RGB gain corrector 55b increases the level of R and decreases the levels of the other colors.

Figure 18:
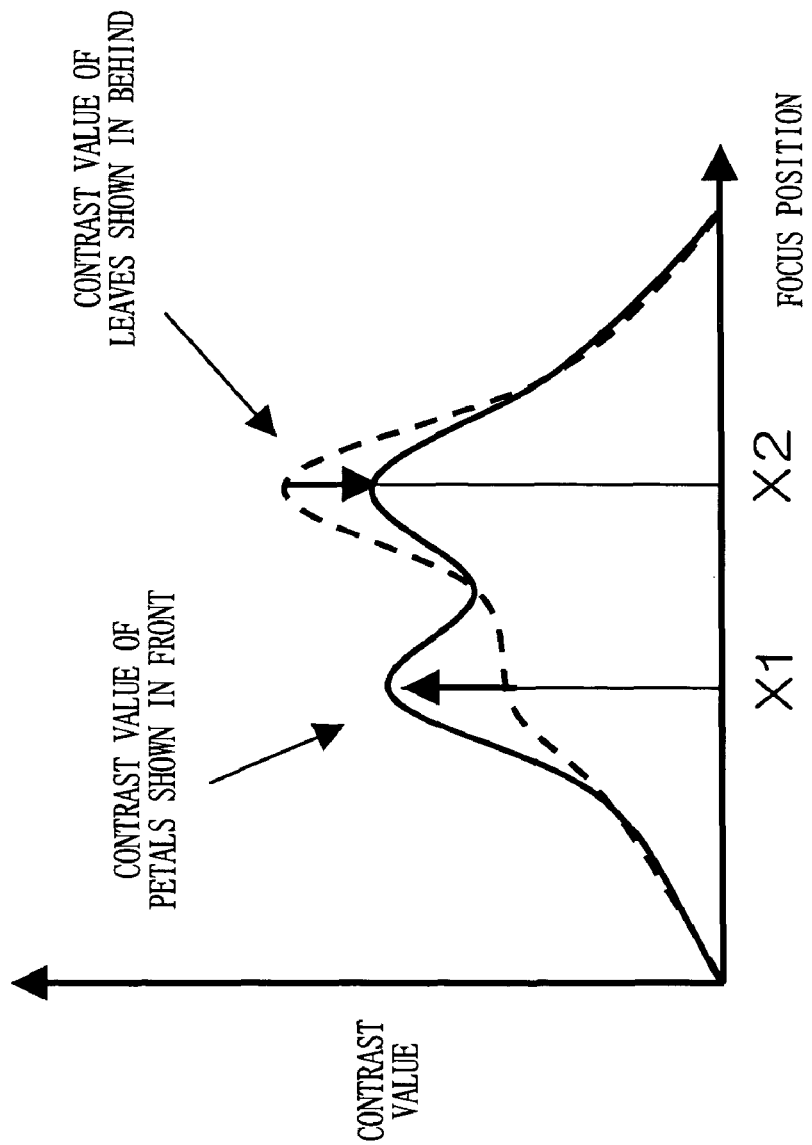
FIG. 18 is a characteristic view of the focus position and the contrast value after the gain correction according to the second embodiment.

FIG. 18 is a characteristic view of the focus position and the contrast value after the gain correction according to the second embodiment, and shows the relationship between the focus position of the area A5 of the object after the RGB gain correction and the average contrast value. As is apparent from FIG. 18, by performing the gain correction by use of the correction information, the contrast value of the red petals shown in front increases and the contrast value of the green leaves shown behind decreases. Consequently, in the example of the object of FIG. 17, the petals which is the object that the user intends to bring in focus can be brought in focus.

As described above, according to the imaging apparatus of the second embodiment, since the gain of the divisional image of the image signal obtained based on the previously stored color characteristic is corrected for focusing, the object intended by the user can be easily brought in focus.

When the preset color characteristic is set in the second embodiment, it is preferable to reset the gains of the colors R, G and B to predetermined initial values. By setting the preset color characteristic by use of the initial set values, the reproducibility of the preset color characteristic can be ensured.

Moreover, in the second embodiment, the processing to correct flaws of pixels that are present in the image signal may be added to the RGB gain corrector 55b. By adding such a processing, the performance for the object following for focusing can be improved.

Moreover, while a structure including 3×3 area frames which are units for the calculation of the color characteristic is described in the second embodiment, a plurality of area frames may be disposed on the display portion 17, or the area frame may substantially coincide with the area frame for which the preset color characteristic is calculated with respect to the area frame.

Moreover, while the processing of step S161 of FIG. 15 is connected to the flow of performing the processing to select a plurality of areas described by use of FIG. 10 in the first embodiment, the present invention is not limited. For example, to improve the accuracy with which the object of the color intended by the user is brought in focus, the function of the processing to select a plurality of areas in the first embodiment may be provided.

Third Embodiment

FIG. 19 is a block diagram of an imaging apparatus according to a third embodiment. Since the schematic structure of the imaging apparatus according to the third embodiment is the same as that of the imaging apparatus according to the first embodiment, the elements that function similarly to those of FIG. 1 are denoted by the same reference numerals and detailed descriptions thereof are omitted.

In FIG. 19, a brightness determiner 37 receives the color characteristic outputted from the color characteristic calculator 34, determines whether the brightness is saturated or not based on V of each area obtained by the expression 1 shown in FIG. 6, and outputs the result. A selection inhibitor 38 transmits inhibition information to an area selector 46 so that the area whose brightness is determined to be saturated by the brightness determiner 37 is not selected as the area to be brought in focus.

FIG. 20 is an operation flowchart of the focus following imaging processing according to the third embodiment. The operation flowchart of the focus following imaging processing of the imaging apparatus according to the third embodiment will be described as an example in which the processings of step S171 and step S172 are added to the operation flowchart (FIG. 10) of the focus following imaging processing described in the first embodiment, and descriptions of the parts overlapping those described in the first embodiment are omitted. This operation flowchart similarly shows the flow of a program that runs on a system controller 60. Like in the first embodiment, when the shutter button 19a is half depressed by the user, the focus following imaging processing is started.

In the second embodiment, after step S151, the process proceeds to step S171. At step S171, when an area whose brightness is saturated is present, the process proceeds to step S172, and when an area whose brightness is saturated is absent, the process returns to step S152.

A case where v of the area A6 of the obtained image signal is 255 and the brightness is saturated will be described as an example. At step S171, the brightness determiner 37 determines that the brightness of the area A6 is saturated, and outputs the result of the determination to the selection inhibitor 38. At step S172, the selection inhibitor 38 outputs inhibition information to inhibit the area selector 46 from selecting the area A8 as the in-focus area, and the process returns to step S152.

Consequently, the in-focus area whose brightness is saturated is not used for focus adjustment. Therefore, in the imaging apparatus according to the third embodiment, since it never occurs that information for obtaining in-focus state is calculated from erroneous contrast information or color characteristic based on a saturated image signal, pseudo in-focus state never occurs.

As described above, according to the imaging apparatus of the third embodiment, since the in-focus area whose brightness is saturated is not used for focus adjustment, pseudo in-focus state never occurs, so that the focusing lens unit can be adequately moved.

Fourth Embodiment

Figure 21:
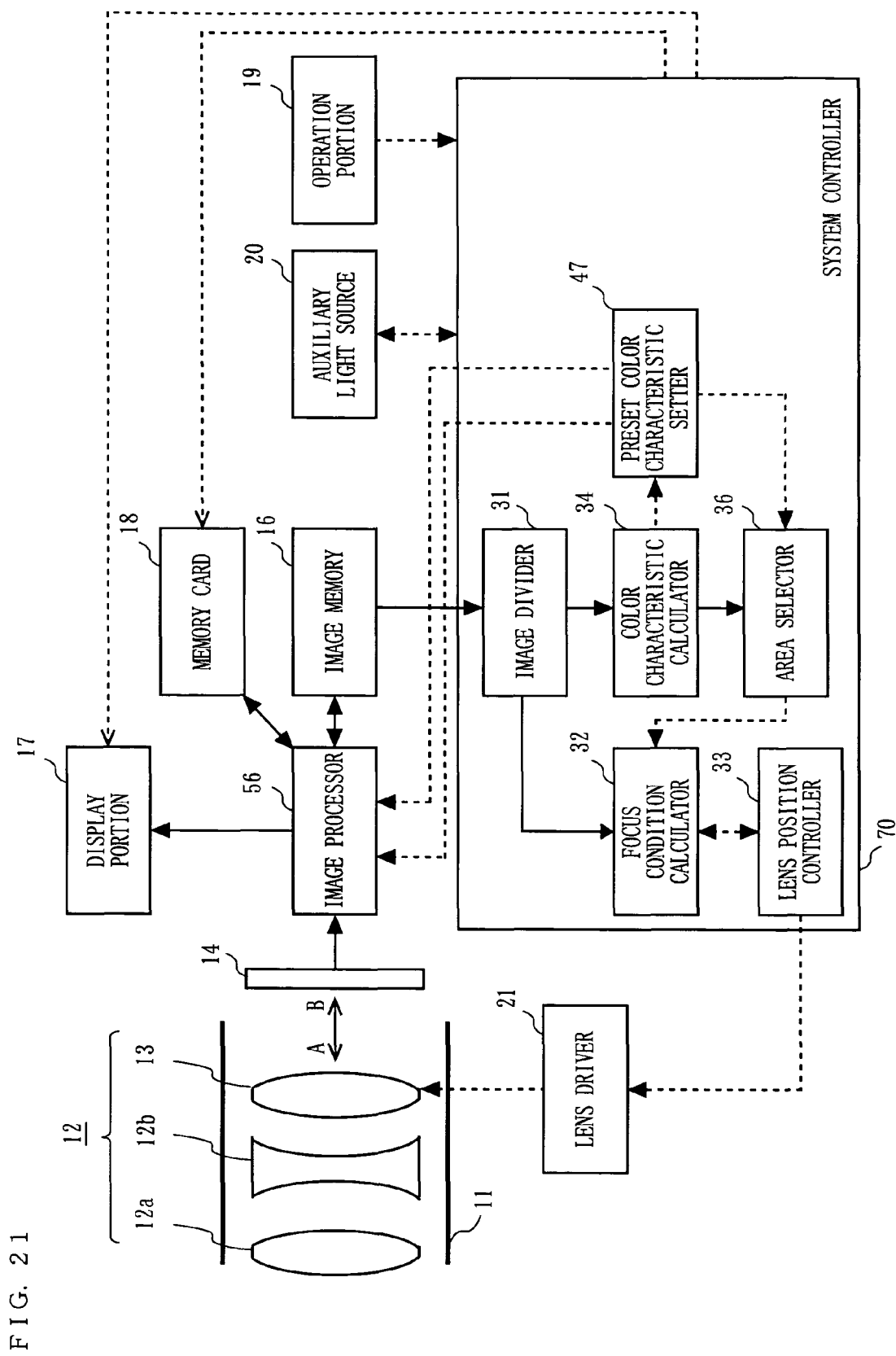
FIG. 21 is a block diagram of an imaging apparatus according to a fourth embodiment.

FIG. 21 is a block diagram of an imaging apparatus according to a fourth embodiment. Since the schematic structure of the imaging apparatus according to the fourth embodiment is the same as that of the imaging apparatus according to the first embodiment, the elements that function similarly to those of FIG. 1 are denoted by the same reference numerals and detailed descriptions thereof are omitted.

In FIG. 21, when the preset color characteristic setting processing is performed, a preset color characteristic setter 47 calculates and stores, of the color characteristic of the areas outputted from the color characteristic calculator 34, the color characteristic of the area selected by the user, and outputs the position of this area and the calculated color characteristic to an image processor 56. When the focus following imaging processing is performed, the preset color characteristic setter 47 reads out the stored color characteristic and outputs it to the area selector 36.

Further, when the focus following imaging processing is performed, the preset color characteristic setter 47 outputs correction information from the preset color characteristic setter 47 to the image processor 56. This correction information is similar to that of the imaging apparatus according to the second embodiment described by use of FIGS. 13 and 14, and a detailed description thereof is omitted.

Figure 22:
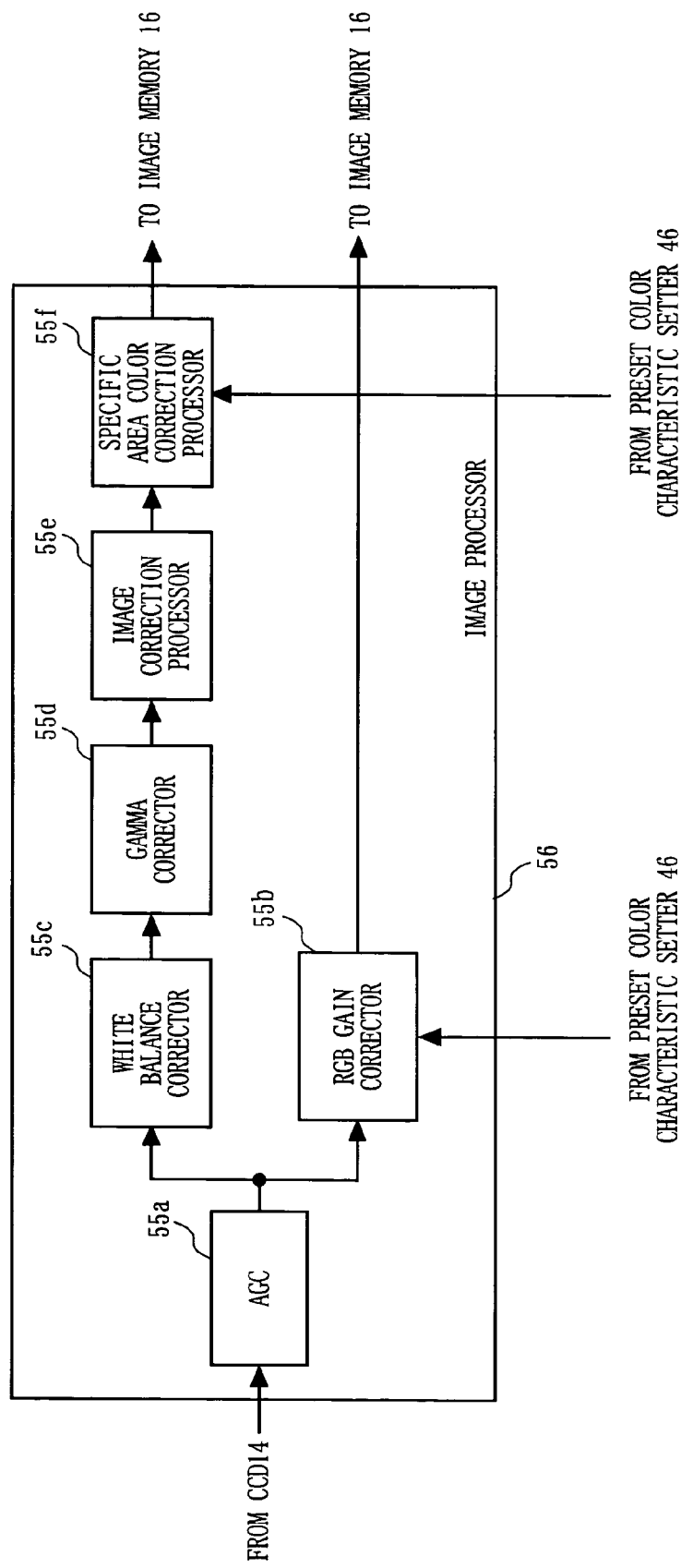
FIG. 22 is a detailed block diagram of an image processor according to the fourth embodiment.

FIG. 22 is a detailed block diagram of the image processor according to the fourth embodiment. In FIG. 22, since the schematic structure of the image processor 56 is the same as that of the image processor 55 according to the second embodiment, the elements that function similarly to those of FIG. 1 are denoted by the same reference numerals and detailed descriptions thereof are omitted.

A specific area color correction processor 55f corrects the color of the specified area based on the position information of the area outputted from the preset color characteristic setter 47 and the calculated color characteristic. The image signal is outputted to the image memory 16 after having undergone the correction processing by the specific area color correction processor 55f.

Figure 23:
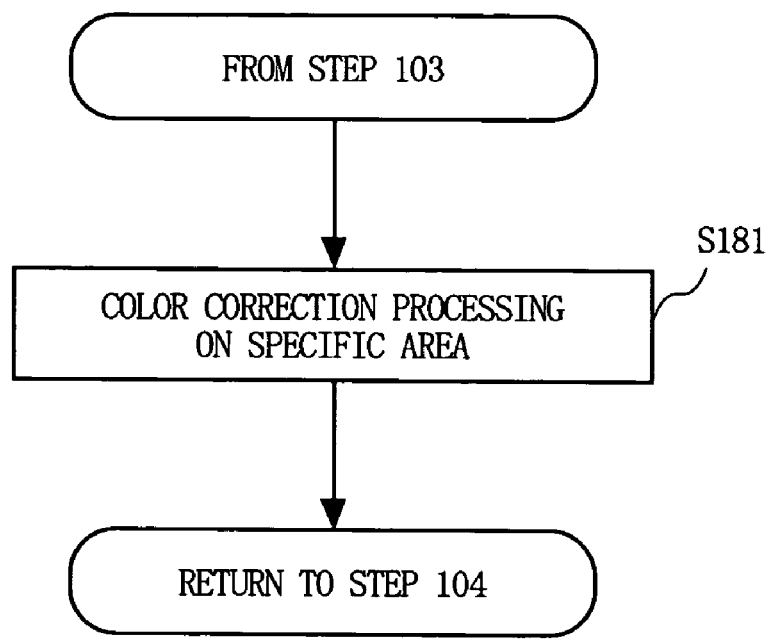
FIG. 23 is an operation flowchart of the preset color characteristic setting of the object according to the fourth embodiment.

FIG. 23 is an operation flowchart of the preset color characteristic setting processing according to the fourth embodiment. The operation flowchart of the focus following imaging processing of the imaging apparatus according to the fourth embodiment will be described as an example in which the processing of step S181 is added to the operation flowchart (FIG. 3) of the preset color characteristic setting processing described in the first embodiment, and descriptions of the parts overlapping those described in the first embodiment are omitted. This operation flowchart similarly shows the flow of a program that runs on a system controller 70. Like in the first embodiment, the preset color characteristic setting processing is started by the cursor key 19b, the enter button 19c, the menu button 19d or the like being operated by the user.

At step S103, after the color characteristic of the selected area is calculated, the processing of step S181 shown in FIG. 223 is performed, and the process returns to step S104. At step S181, the position information and the color characteristic of the area selected by the preset color characteristic setter 47 is transmitted to the specific area color correction processor 55f, and the color correction processing on the specific area is performed.

Figure 24:
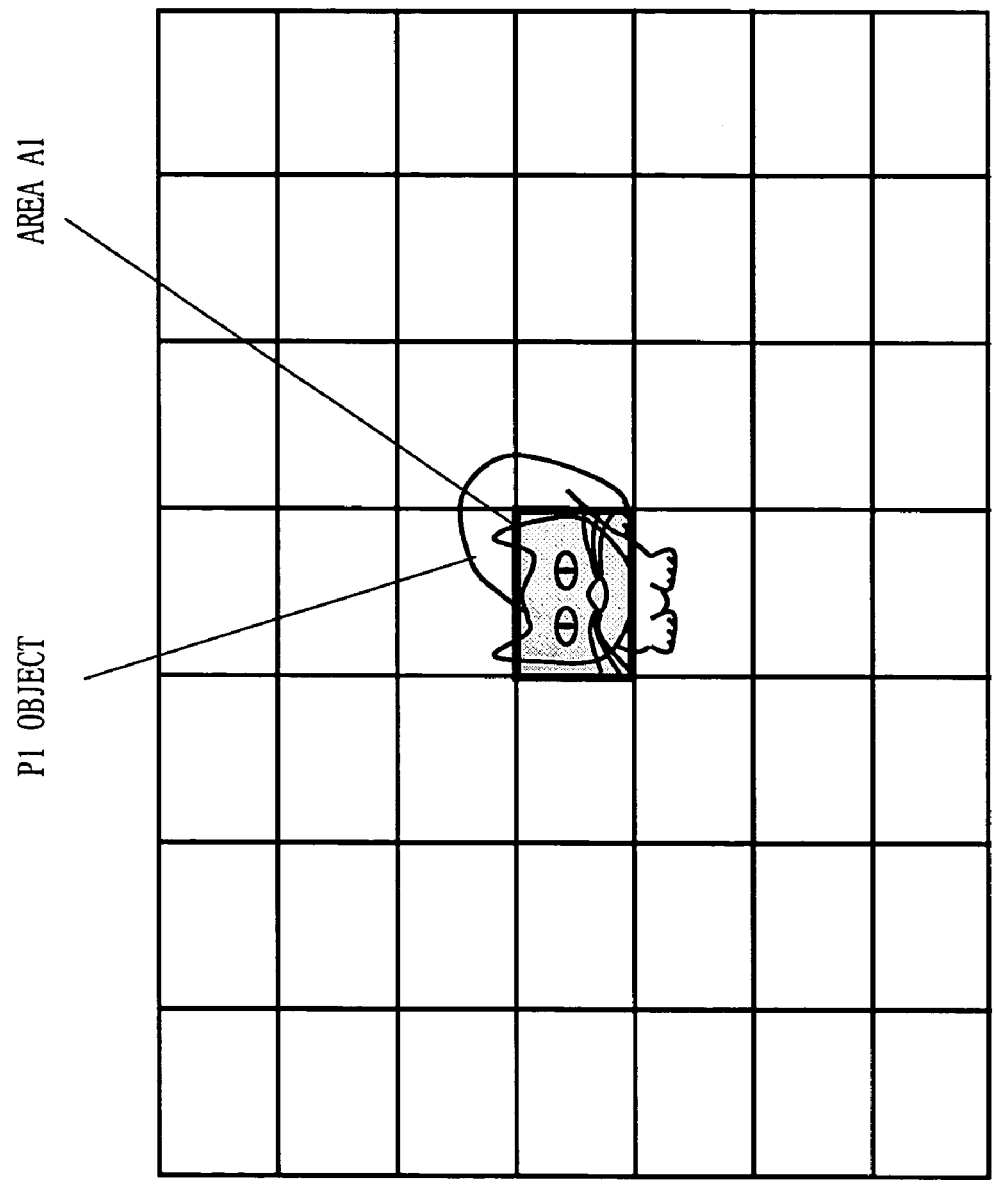
FIG. 24 is a brief view of the display portion where an object and the area frames are shown according to the fourth embodiment.

FIG. 24 is a brief view of the display portion where an object and the area frames are shown according to the fourth embodiment. In the imaging apparatus according to the fourth embodiment, when step S181 is executed, the display condition is as shown in FIG. 24, and the color in the area A1 of the thick frame is replaced with the preset color characteristic. At this time, it is preferable that not the entire area A1 be replaced with the preset color characteristic but by performing edge extraction of the object, the outline or the like is left to thereby prevent the deterioration of the operability for the user. Then, at step S104, the calculated color characteristic is stored in the reference information setter 46, and the preset color characteristic setting processing is ended.

As described above, according to the imaging apparatus of the fourth embodiment, when the color characteristic is referred to, a single piece of color characteristic that is referred to is displayed on the display screen in accordance with the object, so that it can be confirmed whether the color characteristic intended by the user could be extracted or not.

While the size of the area that is referred to and the size of the area where the single-piece of color characteristic that is referred to is displayed are the same in the fourth embodiment, the present invention is not limited thereto. For example, the following may be performed: Comparison with the color characteristic that is referred to is performed for each pixel, and the pixel of close color characteristic is replaced with the color characteristic that is referred to. Moreover, the present invention is not limited to the color characteristic that is referred to but the replacement may be made with a color with high chroma such as red, green or blue or may be made with color characteristic with high viewability such as a complementary color for the preset color characteristic.

Fifth Embodiment

Figure 25:
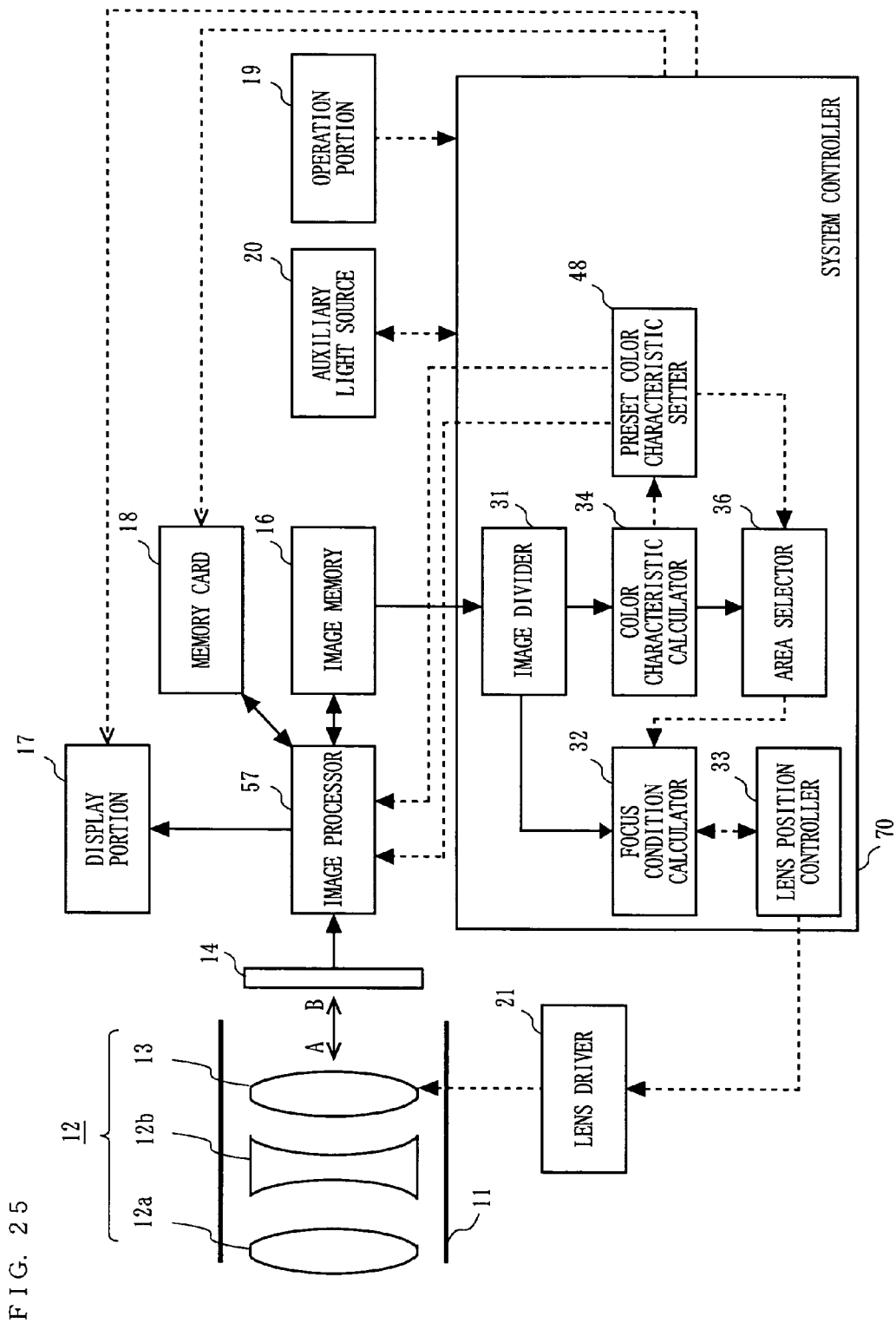
FIG. 25 is a block diagram of an imaging apparatus according to a fifth embodiment of the present invention.

FIG. 25 is a block diagram of an imaging apparatus according to a fifth embodiment of the present invention. Since the schematic structure of the imaging apparatus according to the fifth embodiment is the same as that of the imaging apparatus according to the first embodiment, the elements that function similarly to those of FIG. 1 are denoted by the same reference numerals and detailed descriptions thereof are omitted.

In FIG. 25, when the preset color characteristic setting processing is performed, a preset color characteristic setter 48 calculates and stores, of the color characteristic of the areas outputted from the color characteristic calculator 34, the color characteristic of the area selected by the user, and outputs the position of the area and the calculated color characteristic to an image processor 57. Moreover, when the focus following imaging processing is performed, the preset color characteristic setter 48 reads out, of the stored color characteristic, the color characteristic selected by the user, and outputs it to the area selector 36.

Further, when the focus following imaging processing is performed, the preset color characteristic setter 48 outputs correction information from the preset color characteristic setter 48 to the image processor 57. This correction information is similar to that of the imaging apparatus according to the second embodiment described by use of FIG. 14, and a detailed description thereof is omitted.

Figure 26:
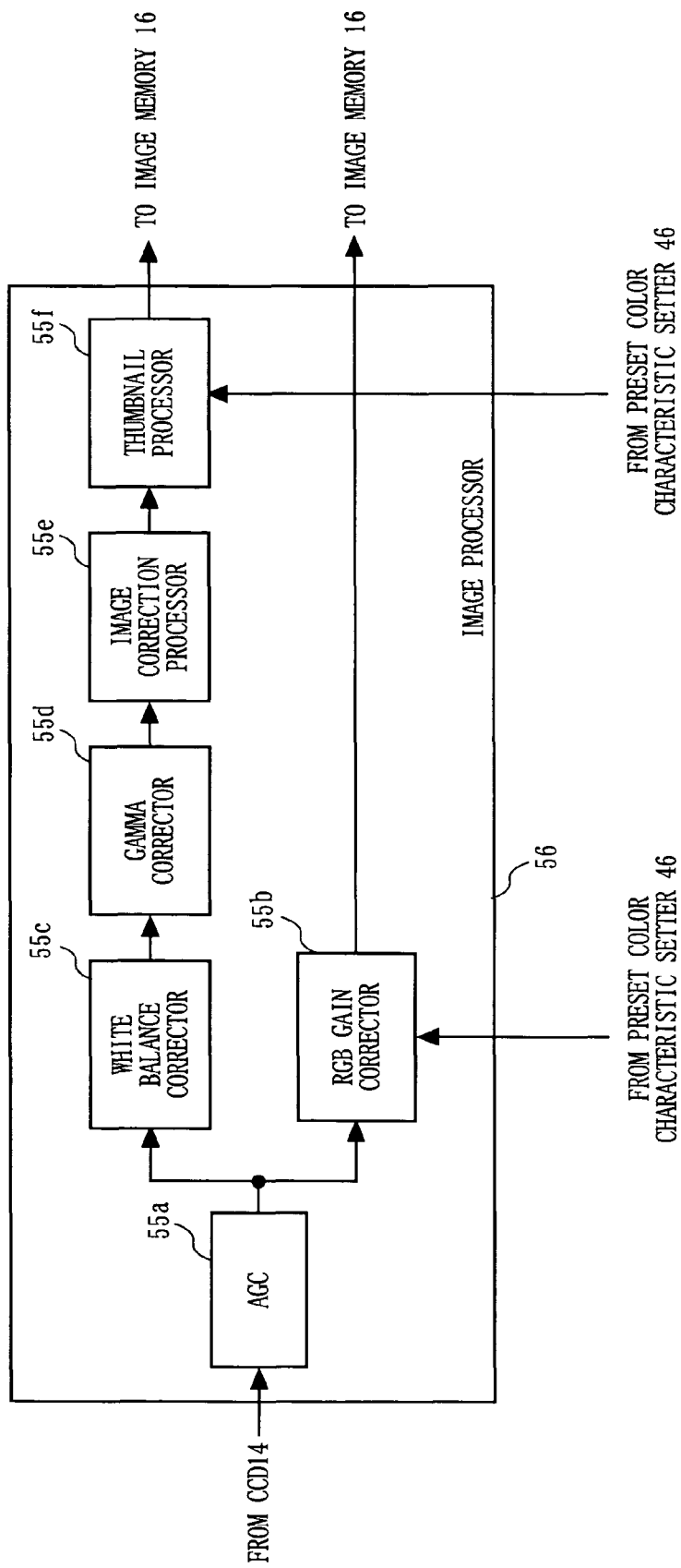
FIG. 26 is a detailed block diagram of an image processor according to the fifth embodiment.

FIG. 26 is a detailed block diagram of the image processor according to the fifth embodiment. In FIG. 26, the schematic structure of the image processor 57 is the same as that of the imaging apparatus 55 of the second embodiment, the elements that function similarly are denoted by the same reference numerals and detailed descriptions thereof are omitted.

A thumbnail processor 55g outputs the image signal of the object referred to for performing the focus following imaging processing to the image memory 16 based on the position information of the area and the preset color characteristic outputted from the preset color characteristic setter 48. The image memory 16 stores the image signal outputted from the thumbnail processor 55g. At the time of focus following, the image signal stored in the image memory 16 at this time is displayed on the display portion 17 as a reference image for selecting the color characteristic to be followed for focusing. Hereinafter, the image signal outputted from the thumbnail processor 55g and stored in the image memory 16 will be referred to as reference image signal for the sake of distinction from the image signal stored in the image memory 16 at the time of normal shooting.

By storing a plurality of reference image signals in the image memory 16 and displaying the reference image signals stored in the image memory 16 on the display portion 17, the user can arbitrarily select the object to be followed for focusing, and details of the processing performed at this time will be described later. The thumbnail processor 55g does not perform the thumbnail processing at the time of normal shooting and at the time of normal monitor display on the display portion. Therefore, in that case, the image signal is directly outputted from the image correction processor 55e to the image memory 16.

Moreover, when the reference image signals are stored in the image memory 16, a nonvolatile memory area is secured in the image memory 16, and the reference image signals are stored therein while being compressed or thinned out. By doing this, a plurality of reference image signals can be stored in a minimum space.

Figure 27:
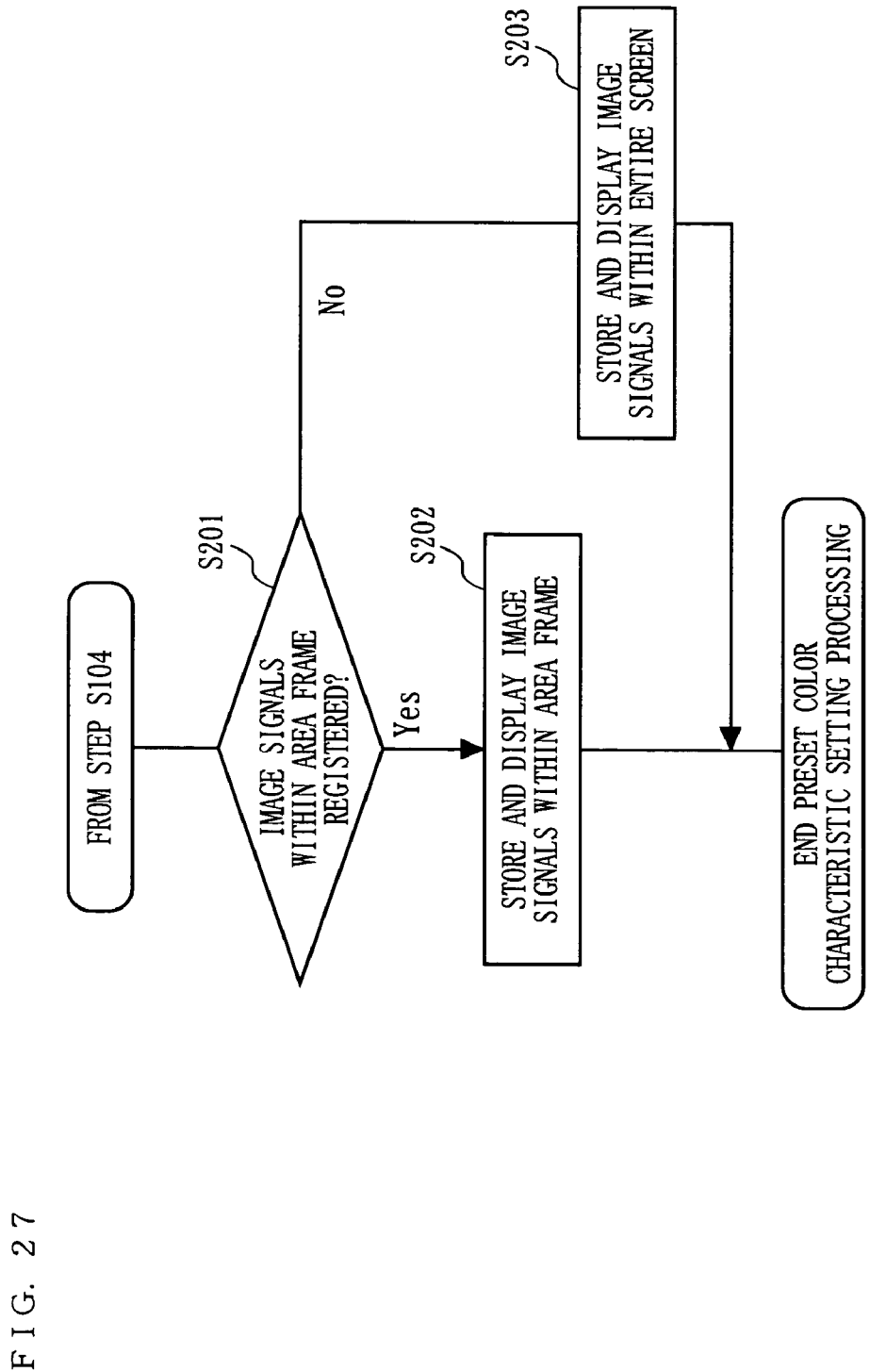
FIG. 27 is an operation flowchart of the preset color characteristic setting processing of the object according to the fifth embodiment of the present invention.

FIG. 27 is an operation flowchart of the preset color characteristic setting processing according to the fifth embodiment of the present invention. The operation flowchart of the preset color characteristic setting processing of the imaging apparatus according to the fifth embodiment will be described as an example in which the processings of steps S201, S202 and S203 are added to the operation flowchart (FIG. 3) of the preset color characteristic setting processing described in the first embodiment, and descriptions of the parts overlapping those described in the first embodiment are omitted. This operation flowchart similarly shows the flow of a program that runs on a system controller 80. Like in the first embodiment, by the cursor key 19b, the enter button 19c, the menu button 19d or the like being operated by the user, the preset color characteristic setting processing is started.

At step S201, the process waits for the input of a selection as to which of the image displayed within the area frame and the image displayed within the entire screen of the display portion 17 is registered as the reference image. At this time, a specific area (an area frame or the entire screen frame) is surrounded by a thick frame to indicate that this area is selectable. The user can move the area of the thick frame by the cursor key 19b. For example, when the user moves the area of the thick frame to the area frame and presses the enter button 19c, the registration of the image displayed within the area frame is selected, and the process proceeds to step S202.

At step S202, the image signals within the area frame are stored into the image memory 16 as the reference image signals, and the reference image based on the reference image signals stored in the image memory 16 is displayed on the display portion 17.

On the other hand, at step S201, when the user moves the area of the thick frame to the entire screen and presses the enter button 19c, the registration of the image signals of the entire screen is selected, and the process proceeds to step S203.

At step S203, the image signals within the entire screen are stored into the image memory 16 as the reference image signals, and the reference image signals stored in the image memory 16 are displayed on the display portion 17.

Figure 28:
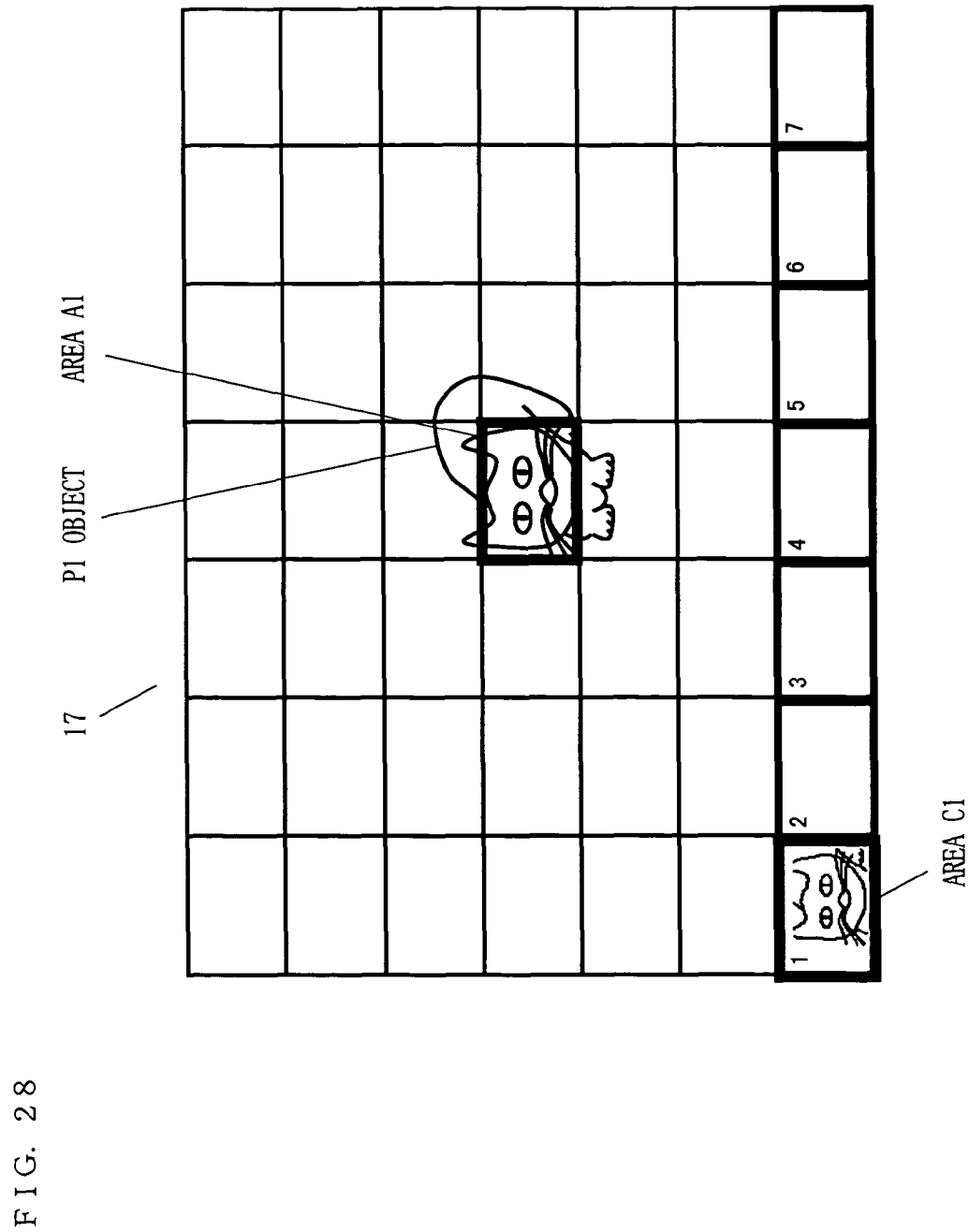
FIG. 28 is a brief view of the display portion where an object, the area frames and a reference image 1 are shown according to the fifth embodiment of the present invention.

Next, a concrete display example of the imaging apparatus according to the present embodiment and the operation of the imaging apparatus will be described. FIG. 28 is a brief view of the display portion where an object, the area frames and a reference image 1 are shown according to the fifth embodiment of the present invention, and shows an example in which 7×7 area frames are displayed together with the object P1. When the mode to refer to the color characteristic is set by the menu button 19d and the enter button 19c, the processing is started with the start of the preset color characteristic setting processing in FIG. 3. Thereafter, the processing described in the first embodiment is performed, and at step S104, the color characteristic calculated by the reference information setter 48 is stored and the process proceeds to step S201 in FIG. 27.

At step S201, the process waits for the input as to which of the image within the frame of the area A1 and the image within the entire screen of the display portion 17 is registered as the reference image. In this example, the user selects the image displayed within the frame of the area A1. When the image within the frame of the area A1 is selected, the processing proceeds to the next step S202.

At step S202, the image signals within the frame of the area A1 are stored into the image memory 16, and the reference image is displayed on the display portion 17 as shown in FIG. 28. The reference image is displayed within a reference image display frame shown on the lower side of the display portion 17. In the example shown in FIG. 28, seven reference image display frames are provided on the lower side of the display portion 17, and the image displayed within the frame of the area A1 is displayed as the reference image in one of the reference image display frames (area C1). Then, the preset color characteristic setting processing is ended.

The preset color characteristic setter 48 holds a table where the reference images and the preset color characteristic are recorded being associated with each other. An example of the table held by the preset color characteristic setter 48 is shown in FIG. 29. In FIG. 29, the reference images are associated with the preset color characteristic (the hue H and the chroma S) used for focus following when the reference image is selected. In the focus following imaging processing, the preset color characteristic setter 48 selects, with reference to the table, the preset color characteristic associated with the reference image selected by the user, as the preset color characteristic used for focus following.

Figure 30:
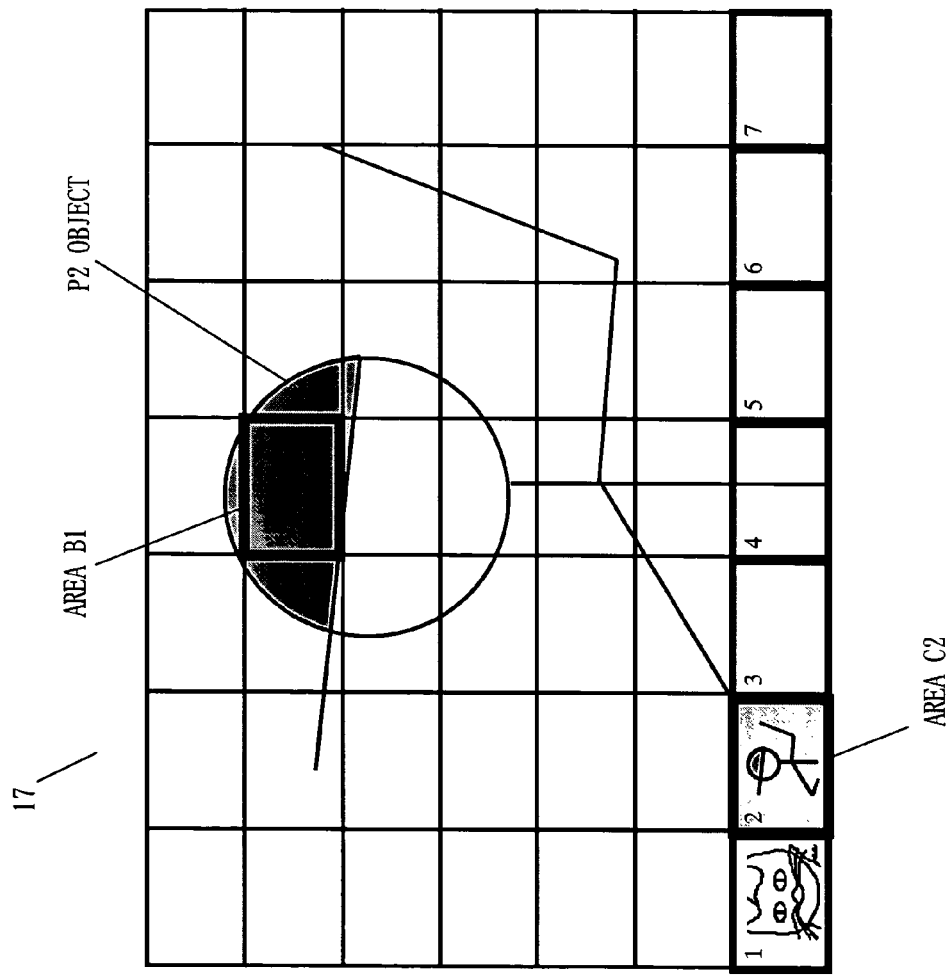
FIG. 30 is a brief view of the display portion where an object, the area frames, a reference image 1 and a reference image 2 are shown according to the fifth embodiment of the present invention.

FIG. 30 is a brief view of the display portion where an object, the area frames, a reference image 1 and a reference image 2 are shown according to the fifth embodiment of the present invention, and shows an example in which 7×7 area frames are displayed together with the object P2. When the mode to refer to the color characteristic is set by the menu button 19d and the enter button 19c, the processing is started with the start of the preset color characteristic setting processing in FIG. 3. Thereafter, the processing described in the first embodiment is performed, and at step S104, the color characteristic calculated by the reference information setter 48 is stored and the process proceeds to step S201 in FIG. 27.

At step S201, the process waits for the input as to which of the image within the frame of the area B1 shown in FIG. 30 and the image within the entire screen is registered as the reference image. In this example, the user selects the image displayed within the entire screen. When the image displayed within the entire screen shown in FIG. 30 is selected, the processing proceeds to the next step S203.

At step S203, the image signals within the entire screen of the display portion 17 are stored into the image memory 16 as the reference image signals, and the reference image is displayed on the display portion 17 as shown in FIG. 30. At this step, the reference image signals are stored being associated with the preset color characteristic (in this case, the color characteristic of the area B1) stored at step S104 shown in FIG. 3.

In the example of FIG. 30, after the image displayed within the area A1 in FIG. 28 is registered as the reference image, the image displayed within the entire screen is registered as the reference image. As shown in FIG. 30, the newly registered reference image 2 is displayed on the lower side of the display portion 17 as the reference image 2 together with the previously registered reference image 1. Then, the preset color characteristic setting processing is ended.

Moreover, it may be performed to perform edge extraction of the object and fill the area selected as the reference image (in this case, the part of the cap of the object P2) with the corresponding color characteristic, or it may be performed to leave the color characteristic of only the part of the selected area. Moreover, it may be performed merely to display only the color characteristic of the selected area as the reference image.

Figure 31:
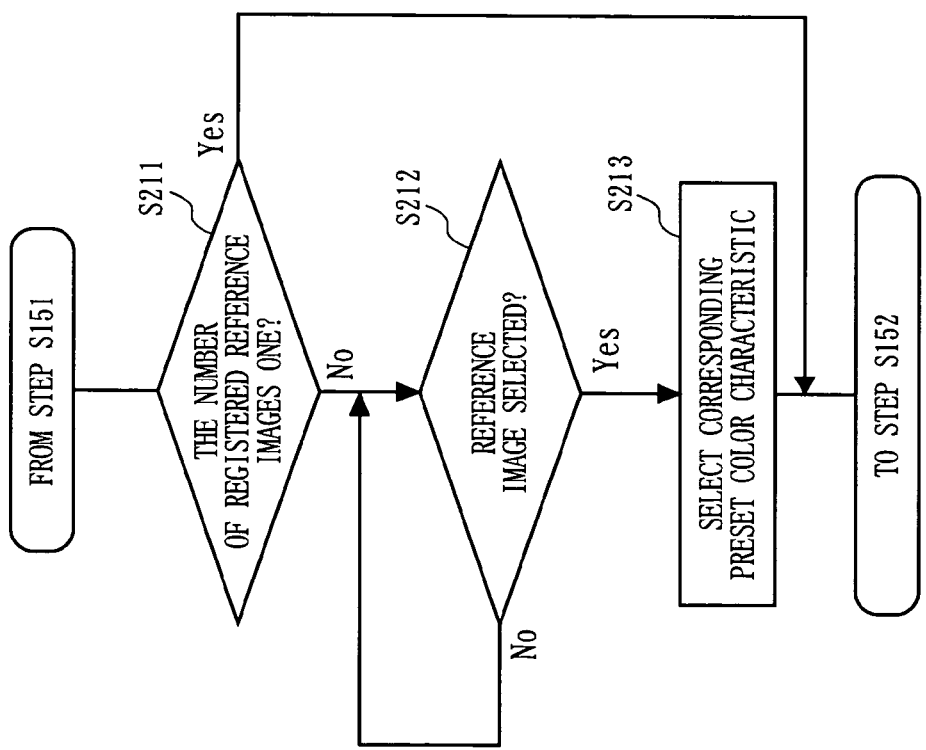
FIG. 31 is an operation flowchart of the focus following imaging processing according to the fifth embodiment of the present invention.
Figure 32:
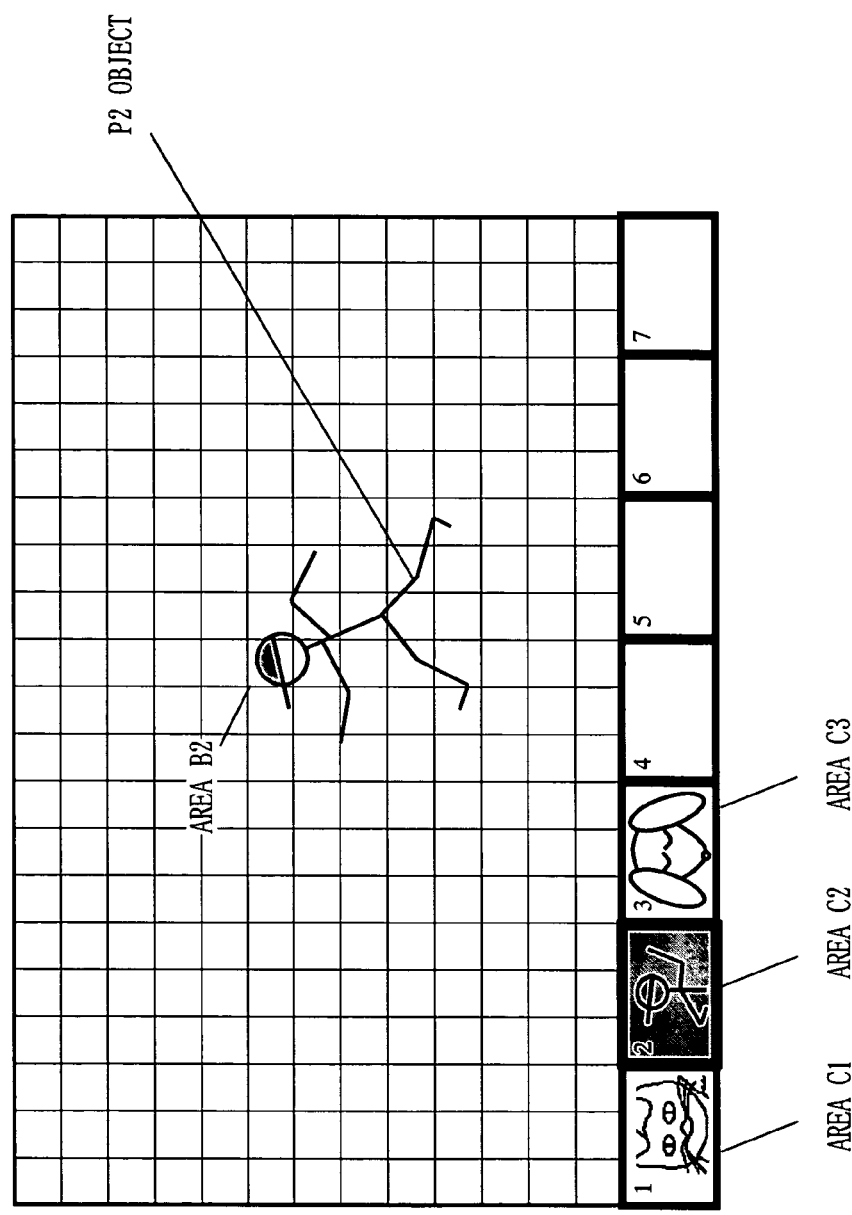
FIG. 32 is a brief view of the display portion where an object, the area frames and reference images 1 to 3 are shown according to the fifth embodiment of the present invention.

FIG. 31 is an operation flowchart of the focus following imaging processing according to the fifth embodiment of the present invention. FIG. 32 is a brief view of the display portion where an object, the area frames and reference images 1 to 3 are shown according to the fifth embodiment of the present invention. Referring to FIGS. 31 and 32, the focus following imaging processing of the imaging apparatus according to the first embodiment will be described.

The operation flowchart shown in FIG. 31 shows the flow of a program that runs on the system controller 80. The operation flowchart of the focus following imaging processing of the imaging apparatus according to the fifth embodiment will be described as an example in which the processings of steps S211 to S213 are added to the operation flowchart (FIG. 10) of the focus following imaging processing described in the first embodiment, and descriptions of the parts overlapping those of the processing described in the first embodiment are omitted. This operation flowchart similarly shows the flow of a program that runs on the system controller 80. Like in the first embodiment, when the shutter button 19a is half depressed by the user, the focus following imaging processing is started.

At step S151 in FIG. 10, the image signal obtained by the CCD 14 and having undergone the predetermined image processings at the image processor 57 is displayed together with the area frames on the display portion 17. A display example of the display portion 17 at this time is shown in FIG. 32. As shown in FIG. 32, on the lower side of the display portion 17, the object P2, 21×13 area frames and seven reference image display frames 1 to 7 for displaying reference images are displayed. In FIG. 32, of the seven reference image display frames, reference images are displayed in the three reference display frames 1 to 3 (areas C1 to C3).

At step S211, it is determined whether the number of registered images is one or not. When there is more than one piece of registered reference image, the process proceeds to the next step S212. On the other hand, when the number of registered image is one, this means that the number of pieces of preset color characteristic stored in the preset color characteristic setter 48 is one. In that case, since it is unnecessary for the preset color characteristic setter 48 to select one piece of preset color characteristic from among a plurality of candidates, the process proceeds to step S152.

At step S212, the process waits for the input as to whether the reference image is selected or not. The user selects a reference image to be followed for focusing from among a plurality of reference images being displayed. In the example shown in FIG. 32, one is selected from among the three reference images 1 to 3 already registered as reference images and displayed. In this example, the user selects the reference image 2 displayed in the area C2. In selecting a reference image from among a plurality of candidates, the selected reference image display frame is made thick or highlighted so that the user can grasp the currently selected reference image. When the reference images are selected by the user, the process proceeds to the next step S213.

At step S213, the preset color characteristic to be followed for focusing is selected. The preset color characteristic setter 48 calculates the reference neighboring area by either of the methods described above with reference to FIGS. 8 and 9 based on the preset color characteristic corresponding to the reference images selected at step S211, and determines whether the color characteristic of each area outputted from the color characteristic calculator 34 is within the reference neighboring area or not. When an area having color characteristic close to the preset color characteristic is present, the process proceeds to step S153, and when such an area is absent, the process proceeds to step S158.

In the example shown in FIG. 32, in the processing from step S152, it is determined that the area coinciding with the preset color characteristic is the area B2, and the processing is performed in the order of steps S152, S153, S156, S157, S160 and S161. Specifically, the defocus amount is calculated in the area B2, and the focusing lens unit 13 is driven in the direction A or B of FIG. 25 by the focus information calculator 32, the lens position controller 33 and the lens driver 21. Then, the focus information calculator 32 calculates the focus position (in-focus position) where the contrast value is highest in the area B2 from the contrast signal generated from the focus position and the image signal, and outputs a control signal to the lens position controller 33.

As described above, according to the imaging apparatus of the fifth embodiment, since a plurality of pieces of color characteristic of the object occurring with a high frequency and that the user intends to shoot can be registered and selected, it is unnecessary to register the color characteristic of the object to be shot every time the object is changed. Consequently, since it is necessary for the user only to select the color characteristic of the target object at the time of shooting, an easy-to-use focus following imaging function can be realized.

Moreover, by storing the reference image signal in a nonvolatile memory area of the image memory 16, after the registration as the reference image signal, the registered reference image can be held irrespective of whether the power of the imaging apparatus is on or off. Moreover, the reference image registered in response to the user's instruction may be erased, or the reference image signal may be stored in a volatile memory area that operates on a secondary power source or the like instead of being stored in a nonvolatile memory area. In a case where the reference image signal is stored in a volatile memory area, even if the registered reference image signal is erased when the power is turned off, when the power is turned on again, the reference image signal is re-registered in operating the imaging apparatus. Moreover, whether the reference image is displayed or not may be switched in response to the user's instruction.

At the time of the adjustment of the imaging apparatus at the factory, a plurality of pieces of typical color characteristic may be registered as a default so that the user can select a desired piece of color characteristic, or it may be performed that the default is erased and the user registers new color characteristic. While an example is described in which the preset color characteristic and the table are stored in the preset color characteristic setter and the reference image signal is stored in the image memory, the storages in which the preset color characteristic, the table and the reference image signal are stored are not limited thereto.

The imaging apparatuses according to the embodiments are not limited to concrete counterparts but may be modified as appropriate. For example, the imaging apparatuses according to the embodiments are described with the following case as an example: a case where the imaging apparatuses are digital still cameras that obtain a still image by the shutter button being operated by the user, they may be applied as digital video cameras where images are continuously obtained at predetermined timing while the shooting button is operated. In this case, the object following for focusing can be performed even when the object moves. Moreover, the imaging apparatus according to the embodiments may be applied to surveillance cameras, vehicle-mounted cameras and web cameras. In this case, while there can be cases where it is difficult for the user to operate the shutter button, the shutter button may be automatically operated at predetermined timing or may be operated by remote control.

While the imaging apparatuses according to the embodiments are examples in which the system controller is individually provided, the present invention may be applied to an imaging system using the control CPU of a personal computer or a mobile telephone terminal in place of the system controller. In addition thereto, elements may be arbitrarily combined together; for example, various combinations may be considered such as an example of a system in which the taking optical system and the image sensor, and other elements are physically separated or an example of a system in which the taking optical system, the image sensor and the image processor, and other elements are physically separated.

Moreover, while the imaging apparatuses according to the embodiments are described as ones having the function to follow the object with mainly the color characteristic as the reference information, instead of using the color characteristic singly, a combination of the brightness value or the contrast level of the object with the color characteristic may be used as the reference information. Moreover, pattern information characterized by high-frequency components of the object which information uses wavelet transformation, discrete cosine transformation (DCT) or the like may be added to the reference information. By doing this, not only the matching of the color characteristic but also the level or pattern matching can be performed, so that the capability to follow the object intended by the user can be further improved.

Moreover, in the imaging apparatuses according to the embodiments, the timing to extract the preset color characteristic may be any of before and after the white balance correction, before and after the R, G and B gain correction and after the gamma correction.

Moreover, while description is given by use of an example in which the area frame of the display portion in the imaging apparatus according to the embodiments are divided into 7×7 frames and displayed, the number of divisions is not limited thereto, but the area frame may be divided into a larger number of frames or a smaller number of frames. Moreover, a structure may be adopted such that the user can arbitrarily set the number of divisions by operating the menu button, or a structure may be adopted such that a plurality of area frames are selected from among preset area frames and set as one area frame.

The imaging apparatus may have a structure that can be separated into the imaging apparatus body and the imaging optical portion including the imaging optical system like so-called single-lens reflex camera systems. In this case, the imaging apparatus body includes the image sensor, the image divider, the color characteristic calculator, the preset color characteristic setter, the area selector and the focus information calculator. However, the lens driver may be provided either on the side of the imaging apparatus body or on the side of the imaging optical portion.

When the lens driver is provided on the side of the imaging optical portion, from the system controller of the imaging apparatus body to the lens driver of the imaging optical portion, the lens driver is operated by an electric instruction by serial communication or the like, whereby the movement of the focusing lens is driven. When the lens driver is provided on the side of the imaging apparatus body, the lens driver of the imaging apparatus body and the focusing lens that is movable in the direction of the optical axis of the imaging optical portion are coupled together by a mechanical interlocking mechanism or the like that directly or indirectly moves the focusing lens in the direction of the optical axis, whereby the movement of the focusing lens is driven. Examples of mechanisms that indirectly control the movement of the focusing lens in the direction of the optical axis include a cam, a reduction mechanism and a mechanism that converts rotation driving into linear driving.

What is claimed is:

1. An imaging apparatus comprising:
   an image sensor that captures the optical image of an object formed by an imaging optical system and converts the optical image into the electrical still image signal;
   a signal processor for dividing a representation of the image signal into a plurality of areas, and for determining a color characteristic for each area of the plurality of areas, the color characteristic consisting of a hue and/or chroma saturation;
   an operation portion for receiving an instruction from a user;
   a controller for setting a preset color characteristic based on the color characteristic of at least one area of the plurality of areas in response to an operation of the operation portion;
   a selector for selecting at least one area of the plurality of areas for which its respective color characteristic substantially corresponds to a preset color characteristic which was previously set by the controller;

an image processor including a corrector that corrects the image signal outputted by the image sensor based on the preset color characteristic; and a focus controller for determining focus parameters of the imaging apparatus only for the at least one area selected by the selector and generating a focus control signal for adjusting the image optical system based on the focus parameters.

2. An imaging apparatus as claimed in claim 1, wherein the preset color characteristic corresponds to a representation of an image previously analyzed.

3. An imaging apparatus as claimed in claim 1, further comprising an information storage that stores a plurality of pieces of preset color characteristic.

4. An imaging apparatus as claimed in claim 3, further comprising a display portion that displays the plurality of pieces of preset color characteristic stored in the information storage.

5. An imaging apparatus as claimed in claim 1, further comprising an information storage that stores a plurality of pieces of preset color characteristic and an image signal for displaying an image associated with the preset color characteristic.

6. An imaging apparatus as claimed in claim 5, further comprising a display portion that displays at least one of an image based on the image signal stored in the information storage and the plurality of pieces of preset color characteristic.

7. An imaging apparatus as claimed in claim 1, further comprising a lens driver for driving the focusing lens unit in a direction of an optical axis based on the focus control signal.

8. An imaging apparatus comprising:
an image sensor that captures the optical image of an object formed by an imaging optical system and converts the optical image into the electrical moving image signal;
a signal processor for dividing a representation of the image signal into a plurality of areas, and for determining a color characteristic for each area of the plurality of areas, the color characteristic consisting of a hue and/or chroma saturation;
an operation portion for receiving an instruction from a user;
a controller for setting a preset color characteristic based on the color characteristic of at least one area of the plurality of areas in response to an operation of the operation portion;
a selector for selecting at least one area of the plurality of areas for which its respective color characteristic substantially corresponds to a preset color characteristic which was previously set by the controller;
an image processor including a corrector that corrects the image signal outputted by the image sensor based on the preset color characteristic; and
a focus controller for determining focus parameters of the imaging apparatus only for the at least one area selected by the selector and generating a focus control signal for adjusting the image optical system based on the focus parameters.

9. An imaging apparatus as claimed in claim 8, further comprising a lens driver for driving the focusing lens unit in a direction of an optical axis based on the focus control signal.

10. An apparatus for controlling focus adjustment of an imaging apparatus comprising:
a signal processor for dividing a representation of an image signal into a plurality of areas, and for determining a color characteristic for each area of the plurality of areas, the color characteristic consisting of a hue and/or chroma saturation;
an operation portion for receiving an instruction from a user;
a controller for setting a preset color characteristic based on the color characteristic of at least one area of the plurality of areas in response to an operation of the operation portion;
a selector for selecting at least one area of the plurality of areas for which its respective color characteristic substantially corresponds to a preset color characteristic which was previously set by the controller;
an image processor including a corrector that corrects the image signal outputted by the image sensor based on the preset color characteristic; and
a focus controller for determining focus parameters of the imaging apparatus only for the at least one area selected by the selector and generating a focus control signal for adjusting the image optical system based on the focus parameters.

11. An imaging apparatus as claimed in claim 10, further comprising a lens driver for driving the focusing lens unit in a direction of an optical axis based on the focus control signal.

12. A method for controlling focusing of an imaging apparatus comprising:
receiving an instruction from a user;
setting a preset color characteristic based on the received instruction;
dividing a representation of an image into a plurality of areas;
calculating color characteristic from the representation for each area of the plurality of areas, the color characteristic consisting of a hue and/or chroma saturation;
comparing respective color characteristic calculated for each area of the plurality of areas with a preset color characteristic which was previously set;
determining at least one area of the plurality of areas for which respective color information substantially corresponds to preset color characteristic based on results of comparison;
correcting the image signal outputted by the image sensor based on the preset color characteristic;
determining focus parameters of an imaging optical system only for the at least one area determined in the step of determining at least one area; and
generating a focus control signal for focus adjustment of the imaging apparatus.

* * * * *